United States Patent
Tse et al.

(10) Patent No.: US 9,473,261 B1
(45) Date of Patent: Oct. 18, 2016

(54) SYSTEM AND METHOD TO ACHIEVE DATAPATH LATENCY SYMMETRY THROUGH AN OTN WRAPPER

(71) Applicant: MICROSEMI STORAGE SOLUTIONS (U.S.), INC., Aliso Viejo, CA (US)

(72) Inventors: Richard Tsz Shiu Tse, Vancouver (CA); Calvin Francis Hass, Vancouver (CA); Winston Ki-Cheong Mok, Vancouver (CA)

(73) Assignee: Microsemi Storage Solutions (U.S.), Inc., Aliso Viejo, CA (US)

( * ) Notice: Subject to any disclaimer, the term of this patent is extended or adjusted under 35 U.S.C. 154(b) by 196 days.

(21) Appl. No.: 14/284,110

(22) Filed: May 21, 2014

Related U.S. Application Data

(60) Provisional application No. 61/871,856, filed on Aug. 29, 2013.

(51) Int. Cl.
| | |
|---|---|
| *H04B 7/212* | (2006.01) |
| *H04J 3/16* | (2006.01) |
| *H04B 10/077* | (2013.01) |
| *H04J 3/14* | (2006.01) |
| *H04Q 11/00* | (2006.01) |

(52) U.S. Cl.
CPC ......... *H04J 3/1658* (2013.01); *H04B 10/0773* (2013.01); *H04J 3/14* (2013.01); *H04Q 11/0066* (2013.01); *H04Q 2011/0083* (2013.01)

(58) Field of Classification Search
CPC ..................................................... H04B 7/212
USPC ......................................................... 370/907
See application file for complete search history.

(56) References Cited

U.S. PATENT DOCUMENTS

| | | | | |
|---|---|---|---|---|
| 6,249,526 B1* | 6/2001 | Loukianov | ............ | H04J 3/1694 348/E7.073 |
| 2002/0013854 A1* | 1/2002 | Eggleston | ............... | H04L 12/14 709/234 |
| 2004/0165508 A1* | 8/2004 | Gushima | .............. | G11B 7/0062 369/59.11 |

FOREIGN PATENT DOCUMENTS

| | | |
|---|---|---|
| EP | 2597790 | 5/2013 |
| WO | 2013/007318 | 1/2013 |
| WO | 2013/079255 | 6/2013 |

* cited by examiner

*Primary Examiner* — Wei Zhao
(74) *Attorney, Agent, or Firm* — Dennis R. Haszko

(57) ABSTRACT

A method of enabling transport of symmetric latency-sensitive constant-bit-rate (CBR) client data streams over an optical transport network (OTN) is provided. The method performs, utilizing an OTN wrapping device, an OTN wrapping operation on a received first constant-bit-rate (CBR) client data stream to form a first framed OTN data stream. The method determines a static wrapping delay induced on the first CBR client data stream by the OTN wrapping operation, performs, utilizing the OTN wrapping device, an OTN unwrapping operation on a received second framed OTN data stream to extract a second CBR client data stream from the second framed OTN data stream, determines a static unwrapping delay induced on the second framed OTN data stream by the OTN unwrapping operation, and equalizes the static wrapping and unwrapping delays by adjusting, at the OTN wrapping device, at least one of the static wrapping and unwrapping delays.

52 Claims, 13 Drawing Sheets

SYSTEM AND METHOD TO ACHIEVE DATAPATH LATENCY SYMMETRY THROUGH AN OTN WRAPPER

CROSS REFERENCE TO RELATED APPLICATIONS

This application claims the benefit of priority of U.S. Provisional Patent Application No. 61/871,856 filed Aug. 29, 2013 which is incorporated herein by reference in its entirety.

FIELD

The present disclosure relates generally to optical communications. More particularly, the present disclosure relates to a system and method for facilitating transport of constant bit rate (CBR) client data streams over an Optical Transport Network (OTN).

BACKGROUND

OTN is a protocol standard that is used for carrying multiple client signals or data streams on optical fibers over long distances with carrier-grade operations, administration, and management (OAM) functionality. OTN offers Time Division Multiplex (TDM) functionality that allows many independent client signals or data streams to be mapped and multiplexed into a higher-rate bit stream and then allows the higher-rate bit stream to be de-multiplexed and de-mapped back into the original independent client signals or data streams with low bit error rate and high fidelity transfer of frequency and phase of the client signals or data streams. The ability to carry more than one client signal or data stream within each OTN stream reduces the number of optical wavelengths or optical fibres required to physically connect all client signal or data stream sources to their destinations. OTN's Forward Error Correction (FEC) operations add at least 6 dB of signal enhancement to the client, facilitating transmission over long distances or facilitating a reduction in the number of optical amplifiers needed. OTN's OAM operations enable communication connections to be properly set up and configured, errors to be monitored, counted, and located, and protection switching to be triggered under failure conditions.

OTN devices introduce asymmetric delay when carrying multiple client signals or data streams. The introduction of asymmetric delay renders OTN devices using the known OTN protocol standard incapable of carrying two-way symmetric client signals or data streams, such as those described in Institute of Electrical and Electronics Engineers (IEEE) 1588 and the Common Public Radio Interface (CPRI) standards.

Improvements to OTN devices using the OTN protocol standard to facilitate the transport of two-way symmetric client signals or data steams over an OTN are therefore desirable.

BRIEF DESCRIPTION OF THE DRAWINGS

Embodiments of the present disclosure will be described, by way of example, with reference to the drawings and to the following description, in which.

DETAILED DESCRIPTION

Figure 1:
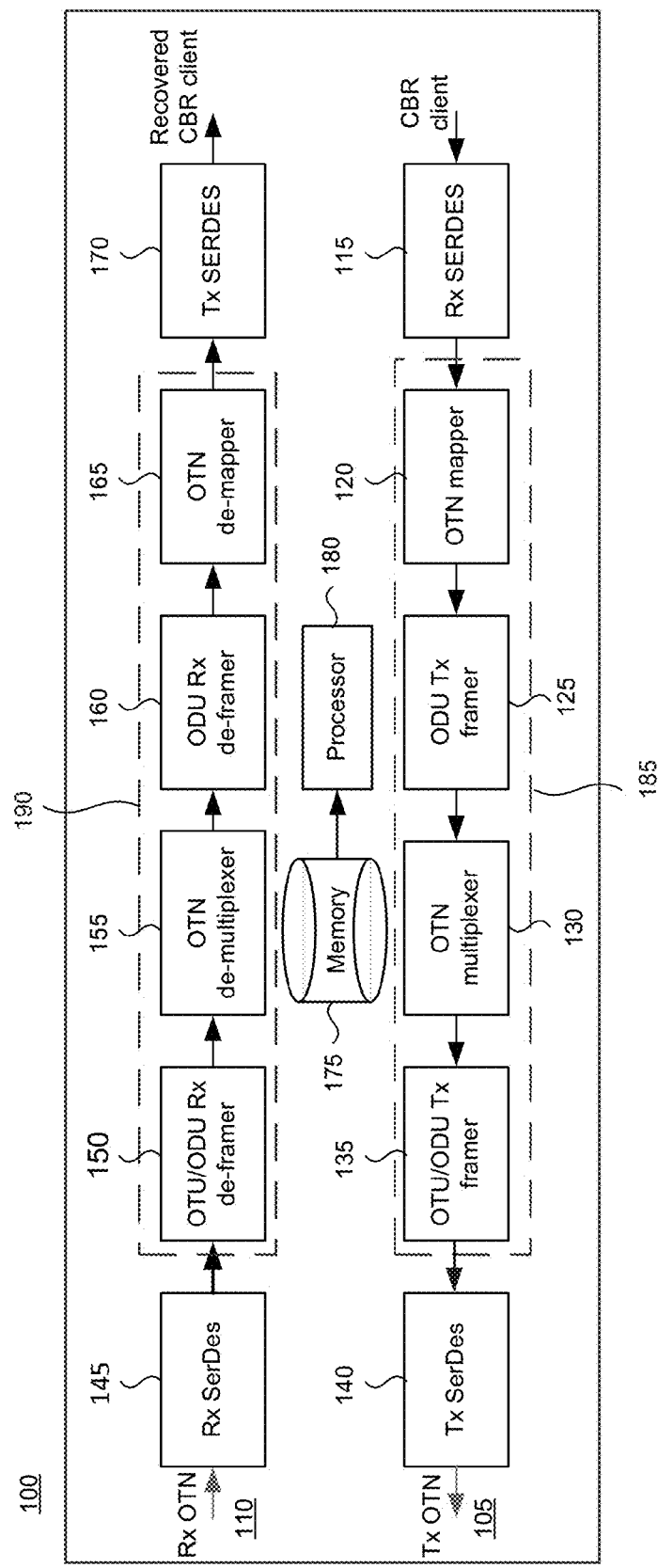
FIG. 1 is a block diagram of an OTN wrapping device in accordance with an embodiment of the present disclosure.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

For the purposes of the present disclosure, the term OTN wrapping operation can refer to an individual OTN wrapping operation or an aggregate OTN wrapping operation. An individual OTN wrapping operation refers to any of the individual operations performed by an OTN mapper, an ODU transmit framer, an OTN multiplexer, and an OTU/ODU transmit framer. An aggregate OTN wrapping operation comprises a plurality of cascaded OTN wrapping operations, each of the plurality of cascaded OTN wrapping operations being an individual OTN wrapping operation. The term OTN unwrapping operation can refer to an individual OTN unwrapping operation or an aggregate OTN unwrapping operation. An individual OTN unwrapping operation refers any of the individual operations performed by an OTU/ODU receive de-framer, an OTN de-multiplexer, an ODU receiver de-framer, and an OTN de-mapper. An aggregate OTN unwrapping operation comprises a plurality of cascaded OTN unwrapping operations, each of the plurality of cascaded OTN unwrapping operations being an individual OTN unwrapping operation.

The term static wrapping delay can refer to a static delay induced on a first CBR client data stream by an individual OTN wrapping operation or by an aggregate OTN wrapping operation. The term total wrapping delay can refer to a total delay induced on a first CBR client data stream by an individual OTN wrapping operation or by an aggregate OTN wrapping operation. The term intrinsic dynamic wrapping delay can refer to an intrinsic delay associated with any of the individual OTN wrapping operations or with the aggregate OTN wrapping operation. The term a total individual wrapping delay refers to any delay induced on a first CBR client data stream by any of the individual OTN operations. The term individual intrinsic dynamic wrapping delay refers to an intrinsic delay associated with any of the individual OTN wrapping operations.

The term static unwrapping delay can refer to a static delay induced on a second CBR client data stream by an individual OTN unwrapping operation or by an aggregate OTN unwrapping operation. The term a total unwrapping delay can refer to a total delay induced on a second CBR client data stream by an individual OTN unwrapping operation or by an aggregate OTN unwrapping operation. The term intrinsic static unwrapping delay can refer to an intrinsic delay associated with any of the individual OTN unwrapping operations or associated with the aggregate OTN unwrapping operation. A total individual unwrapping delay refers to any delay induced on a second CBR client data stream by any of the individual OTN operations. The term individual intrinsic dynamic unwrapping delay refers to an intrinsic delay associated with any of the individual OTN wrapping operations.

The present disclosure generally relates to a system and method that enables OTN to be used as a carrier of symmetric latency-sensitive CBR client signals or data streams. The system and method of the present disclosure facilitate measurement of a delay induced on a CBR client data stream as the CBR client data stream passes through OTN framing, OTN mapping, and OTN multiplexing operations in an OTN wrapping data path of a bidirectional communication link. The system and method of the present disclosure also facilitate measurement of a delay induced on another CBR client data stream as the other CBR client data stream passes through OTN de-mapping, OTN de-multiplexing, and OTN de-framing operations in a OTN unwrapping data path of the bidirectional communication link. Additionally, the system and method of the present disclosure facilitate adjustment of the delays induced on CBR client data streams in each direction of a bidirectional communication link, as CBR client data streams pass through the same OTN wrapping and OTN unwrapping operations to equalize the delays between the two directions of the bidirectional communication link. The system and method of the present disclosure also facilitate transport of symmetric latency-sensitive CBR client signals or data streams over OTN, such as, for example, Ethernet streams carrying IEEE 1588 messages and CPRI streams, with minimal degradation in their latency symmetry OTN framing, mapping, multiplexing, de-mapping, and de-multiplexing operations each induce a static and a dynamic delay on a CBR client data stream. The system and method of the present disclosure measures and adjusts induced static and dynamic delays based on characteristics of OTN wrapping and OTN unwrapping operations.

For a CBR client data stream, the dynamic portions of the complementary OTN wrapping and unwrapping delays can be shown to sum to a static delay when added together. This is because the same CBR data stream exists at both ends of a communication link, with only a static delay differentiating the two ends. Thus, the OTN wrapping and OTN unwrapping dynamic delays may be converted into a corresponding static delay.

The intrinsic dynamic delay of an individual OTN wrapping operation is inherent to the definition of the OTN wrapping operation and is independent of the implementation OTN wrapping operation. Similarly, the intrinsic dynamic delay of an OTN unwrapping operation is inherent to the definition of the OTN unwrapping operation and is independent of the implementation of the OTN unwrapping operation.

The intrinsic dynamic delays induced upon a specific client bit in a CBR client data stream by an individual OTN wrapping operation, or an individual OTN unwrapping operation, or several cascaded OTN wrapping operations, or several cascaded OTN unwrapping operations, whose dynamic delay patterns do not shift past each other, may be accurately determined from a location of the client bit within an OTN frame. Thus, a single delay measurement may be utilized to uniquely quantify both the intrinsic dynamic delay component and the implementation specific static delay component, which reduces the number of measurements required to characterize the total static delay of the OTN wrapping operation, or the OTN unwrapping operation.

For cascaded OTN wrapping operations, or cascaded OTN unwrapping operations, when the intrinsic dynamic delay pattern of each individual OTN wrapping operation, or OTN unwrapping operation, shifts in time, past the dynamic delay pattern of the other OTN wrapping, or the other unwrapping operation, in the OTN wrapping and OTN unwrapping data path, respectively, the maximum aggregated dynamic delay of the cascaded OTN wrapping operations, or the cascaded OTN unwrapping operations is equal to the sum of the maximum intrinsic dynamic delays of each individual OTN wrapping or OTN unwrapping operations. Similarly, the minimum aggregated dynamic delay of the cascaded OTN wrapping or OTN unwrapping operations is equal to the sum of the minimum intrinsic dynamic delays of the individual OTN wrapping or OTN unwrapping operations. Thus, the aggregated OTN wrapping static delay (i.e. the total delay of all OTN wrapping operations) may be found using the static delays of individual OTN wrapping operations. The aggregated OTN unwrapping static delay (i.e. the total delay of all OTN unwrapping operations) may be found using the static delays of individual OTN unwrapping operations Using the characteristics defined in the previous paragraphs, the system and method of the present disclosure transform static and dynamic delay components into a strictly static total delay (i.e., an implementation-specific static delay plus the OTN wrapping static delay). After the difference between the aggregated or total static delay of the OTN wrapping data path and the aggregated or total static delay of the OTN unwrapping path within an OTN wrapping device is determined, the delays in the OTN wrapping and OTN unwrapping data paths may be equalized by adjusting the output rate of a selected OTN wrapping or OTN unwrapping operation. This causes a storage buffer associated with the OTN wrapping or unwrapping operation to increase or decrease from its previous fill level, which causes a corresponding increase or decrease in the static delay of the OTN wrapping or OTN wrapping data path, respectively.

Thus, according to an embodiment of the present disclosure, each OTN wrapping device equalizes the static delays through its own OTN wrapping and OTN unwrapping data paths. Knowledge of delays in other OTN wrapping devices in the network is unnecessary. If a physical optical fibre is symmetrical and if every OTN wrapping device in a bidirectional communication link that includes an OTN wrapping and an OTN unwrapping data path equalizes its own delays, the end-to-end delay in both directions is symmetrical, thus satisfying the requirements for transporting symmetric latency-sensitive CBR client data streams over an OTN.

According to an aspect, the present disclosure provides a method of enabling transport of symmetric latency-sensitive constant bit rate (CBR) client data streams over an optical transport network (OTN). The method includes performing, utilizing an OTN wrapping device, an OTN wrapping operation on a first constant bit rate (CBR) client data stream to form a first framed OTN data stream. The first framed OTN data stream comprises the first CBR client data stream. The method also includes determining a static wrapping delay induced on the first CBR client data stream by the OTN wrapping operation, and performing, utilizing the OTN wrapping device, an OTN unwrapping operation on a second framed OTN data stream to extract a second CBR client data stream from the second framed OTN data stream. The second framed OTN data stream comprises the second CBR client data stream. The method also includes determining a static unwrapping delay induced on the second CBR client data stream by the OTN unwrapping operation, equalizing the determined static wrapping and unwrapping delays by adjusting, at the OTN wrapping device, at least one of the static wrapping delay and the static unwrapping delay.

In another aspect, the OTN wrapping operation comprises an aggregate OTN wrapping operation comprising a plurality of cascaded OTN wrapping operations and the OTN unwrapping operation comprises an aggregate OTN unwrapping operation comprising a plurality of cascaded OTN unwrapping operations. Each of plurality of cascaded OTN wrapping operations is an individual OTN wrapping operation and each of the plurality of cascaded OTN unwrapping operations is an individual OTN unwrapping operation. The method also includes determining a total static wrapping delay induced on the first CBR client data stream by each of the plurality of cascaded OTN wrapping operations by determining a static wrapping delay induced on the first CBR client data stream for each of the plurality cascaded of OTN wrapping operations, and aggregating the static wrapping delay determined for each of the plurality of cascaded OTN operations, The method also includes determining a total static unwrapping delay induced on the second CBR client data stream by a plurality of cascaded OTN unwrapping operations by determining a static unwrapping delay induced on the second CBR client data stream for each of the plurality of cascaded OTN unwrapping operations, and aggregating the static unwrapping delay determined for each of the plurality of cascaded OTN unwrapping operations. In another aspect, equalizing includes adjusting at least one of the static wrapping delay and the static unwrapping delay based on a difference between the static wrapping delay and the static unwrapping delay.

In another aspect, equalizing includes comparing the static wrapping delay to a predetermined value, and when the static wrapping delay and the predetermined value are unequal, adjusting the static wrapping delay to match the predetermined value, comparing the static unwrapping delay to a predetermined value, and when the static unwrapping delay and the predetermined value are unequal, adjusting the static unwrapping delay to match the predetermined value.

In another aspect, determining a static wrapping delay includes: (a) measuring a total wrapping delay induced on the first CBR client data stream by the OTN wrapping operation; (b) determining an intrinsic dynamic wrapping delay associated with the OTN wrapping operation; and (c) obtaining the static wrapping delay by subtracting the determined intrinsic dynamic delay from the measured total delay to obtain the static wrapping delay.

In another aspect, the method determines a static wrapping delay induced on the first CBR client data stream for each of the plurality of OTN wrapping operations by: measuring a total individual wrapping delay induced on the first CBR client data stream by each of the plurality of OTN wrapping operations, determining an individual intrinsic dynamic wrapping delay associated with each of the plurality of OTN wrapping operations; and obtaining the static wrapping delay for each of the plurality of OTN wrapping operations by subtracting, for each of the plurality of OTN wrapping operations, the determined intrinsic dynamic wrapping delay from the measured total individual wrapping delay.

In another aspect, measuring the total wrapping total delay includes: (d) replacing a predetermined number of client data bits in the first CBR client data stream with a predetermined pattern of data bits; (e) detecting, at an input of the OTN wrapping device, the predetermined pattern of data bits; (f) recording a first time when the predetermined pattern of data bits is detected; (g) detecting, at an output of the OTN wrapping operation, the predetermined pattern of data bits in the first framed OTN data stream; (h) recording a second time when the predetermined pattern of data bits in the first framed OTN data stream is detected; (i) subtracting the first time from the second time to obtain the total wrapping delay; and (j) restoring the predetermined number of client data bits in the first framed OTN data stream at the output of the OTN wrapping operation.

In another aspect, the method includes repeating (d)-(j), (b), and (c) for a plurality of iterations, and averaging the static wrapping delay obtained from each iteration to reduce the effects of measurement noise and to obtain a better estimate of the static wrapping delay.

In another aspect, determining the intrinsic dynamic wrapping delay includes: detecting, at the output of the OTN wrapping operation, a position of the predetermined pattern data bits in an OTN frame of the OTN data stream; and obtaining the intrinsic dynamic delay associated with the OTN wrapping operation for the position of the predetermined pattern data bits in the OTN frame of the first framed OTN data stream.

In another aspect, measuring the total wrapping delay includes (k) identifying a set of data bits in the first CBR client data stream; (l) detecting, at an input of the OTN wrapping device, the set of data bits; (m) recording a first time when the set of data bits is detected at the input of the OTN wrapping operation; (n) detecting, at an output of the OTN wrapping operation, the set of data bits in the first framed OTN data stream; (o) recording a second time when the set of data bits in the first framed OTN data stream is detected at the output of the OTN wrapping operation; and (p) subtracting the first time from the second time.

In another aspect, the method includes repeating (k)-(p), (b), and (c) for a plurality of iterations, and averaging the static wrapping delay obtained from each iteration to reduce the effects of measurement noise and obtain a better estimate of the static wrapping delay.

In another aspect, the set of data bits is a naturally occurring pattern of data bits in the CBR client data stream.

In another aspect, determining a static unwrapping delay includes: (a) measuring a total unwrapping delay induced on the second CBR client within the second framed OTN data stream by the OTN unwrapping operation; (b) determining an intrinsic dynamic unwrapping delay associated with the OTN unwrapping operation; and (c) obtaining the static unwrapping delay by subtracting the determined intrinsic dynamic unwrapping delay from the total unwrapping delay.

In another aspect, the method determines a static unwrapping delay induced on the second CBR client data stream for each of the plurality of OTN unwrapping operations by: measuring a total individual unwrapping delay induced on the second CBR client data stream by each of the plurality of OTN unwrapping operations, determining an intrinsic dynamic unwrapping delay associated with each of the plurality of OTN unwrapping operations; and obtaining the static unwrapping delay induced on the second CBR client data stream for each of the plurality of OTN unwrapping operations by subtracting, for each of the plurality of OTN unwrapping operations, the determined intrinsic dynamic unwrapping delay from the measured total individual unwrapping delay.

In another aspect, measuring the total unwrapping delay includes: (d) replacing a predetermined number of client data bits of the second CBR client data stream with a predetermined pattern of data bits; (e) detecting, at an input of the OTN unwrapping operation, the predetermined pattern of data bits; (f) recording a first time when the predetermined pattern of data bits is detected at the input of the OTN wrapping operation; (g) detecting, at an output of the OTN unwrapping device, the predetermined pattern of data bits; (h) recording a second time when the predetermined pattern of data bits is detected at the output of the OTN wrapping operation; (i) subtracting the first time from the second time to obtain the total unwrapping delay; and (j) restoring the predetermined number of bits of the second CRB client data stream at the output of the OTN unwrapping operation.

In another aspect, the method includes excluding, from the measurement of the total unwrapping delay, an intrinsic delay associated with OTN Forward Error Correction decoding of the OTN unwrapping operation from total unwrapping delay.

In another aspect, the method includes repeating (d)-(j), (b), and (c) for a plurality of iterations and averages the static unwrapping delay obtain from each iteration to reduce the effects of measurement noise and obtain a better estimate of the static unwrapping delay.

In another aspect, determining the intrinsic dynamic unwrapping delay includes: detecting, at the input of the OTN unwrapping operation, a position of the predetermined pattern of data bits in an OTN frame of the second framed OTN data stream; and obtaining the intrinsic dynamic delay associated with the OTN unwrapping operation for the position of the predetermined pattern of data bits in the OTN frame of the second framed OTN data stream.

In another aspect, measuring a total unwrapping delay comprises: (k) identifying a set of data bits in the second framed OTN data stream; (l) detecting, at an input of the OTN unwrapping operation, the set of data bits; (m) recording a first time when the set of data bits is detected at the input of the OTN unwrapping operation; (n) detecting, at an output of the OTN unwrapping operation, the set of data bits; (o) recording a second time when the set of data bits in the second CBR client data stream is detected at the output of the OTN unwrapping operation; and subtracting the first time from the second time to obtain the total unwrapping delay.

In another aspect, the method excludes an intrinsic dynamic delay associated with an OTN Forward Error Correction decoding of the OTN unwrapping operation from total unwrapping delay.

In another aspect, the method includes repeating (k)-(p), (b), and (c) for a plurality of iterations and averages the static unwrapping delay obtained from each iteration to reduce the effects of measurement noise and obtain a better estimate of the static unwrapping delay.

In another aspect, the set of data bits is a naturally occurring pattern of data bits in the second framed OTN data stream.

In another aspect, adjusting includes adjusting the static wrapping delay when the static wrapping delay is greater than the static unwrapping delay.

In another aspect, adjusting includes adjusting a rate of the OTN wrapping operating for a predetermined period of time.

In another aspect, adjusting includes adjusting the static unwrapping delay when the static unwrapping delay is greater than the static wrapping delay.

In another aspect, adjusting includes adjusting a rate of the OTN unwrapping operation for a predetermined period of time.

In another aspect, the present disclosure provides a system for enabling transport of symmetric latency-sensitive constant bit rate (CBR) client data streams over an optical transport network (OTN). The system includes an OTN wrapping device configured to: perform an OTN wrapping operation on a first CBR client data stream received from a network to form a first framed OTN data stream, the first framed OTN data stream including the CBR client data stream, and perform an OTN unwrapping operation on a second framed OTN data stream received from the network to extract the second CBR client data stream from the second framed OTN data stream. The system also includes a processor operably coupled to the OTN wrapping device and configured to: determine a static wrapping delay induced on the first CBR client data stream by the OTN wrapping operation; determine a static unwrapping delay induced on the second CBR client data stream by the OTN unwrapping operation; and equalize the determined static wrapping and unwrapping delays by adjusting at least one of the determined static wrapping delay and the static unwrapping delay.

A block diagram of an embodiment of an OTN wrapping device is shown in FIG. 1. The OTN wrapping device 100 includes an OTN wrapping data path 105 and an OTN unwrapping data path 110. In the OTN wrapping data path 105, the OTN wrapping device 100 includes a receive serial/deserializer (SERDES) 115, an OTN mapper 120, an ODU transmit framer 125, an OTN multiplexer 130, an OTU/ODU transmit framer 135, and a transmit SerDes 140. In the OTN unwrapping data path 110, the OTN wrapping device 100 includes a receiver SerDes 145, an OTU/ODU receiver de-framer 150, an OTN de-multiplexer 155, an ODU receiver de-framer 160, an OTN de-mapper 165, and a transmit SerDes 170. The OTN wrapping device 100 also includes a processor 180 and an associated memory 175 that cooperate to control the operation of the OTN wrapping device 100.

In the OTN wrapping data path 105, the receive SerDes 115 receives a first CBR client data stream from a network element (not shown) supporting a CBR client protocol and forwards the received first CBR client data stream to the OTN mapper 120. The OTN mapper 120, the ODU transmit framer 125, the OTN multiplexer 130, and the OTU/ODU transmit framer 135 each perform an individual OTN wrapping operation, and together perform an aggregate OTN wrapping operation 185 on the received first CBR client data stream, so as to form an first framed OTN data stream. That is, the OTN mapper 120, the ODU transmit framer 125, the OTN multiplexer 130, and the OTU/ODU transmit framer 135 map, frame, and multiplex the received first CBR client data stream into an OTN frame. The transmit SerDes 140 receives the first framed OTN data stream and transmits the first framed OTN data stream to another network element in the OTN.

In the OTN unwrapping data path 110, the receiver SerDes 145 receives a second framed OTN data stream from a network element of the OTN and forwards the received second framed OTN data stream to the OTU/ODU receiver de-framer 150. The OTU/ODU receiver de-framer 150, the OTN de-multiplexer 155, the ODU receiver de-framer 160, and the OTN de-mapper 165 each perform an OTN unwrapping operation, and together perform an aggregate OTN unwrapping operation 190 on the received second framed OTN data stream, so as to extract a CBR client data stream from the second framed OTN data stream. That is, the OTU/ODU receiver de-framer 150, the OTN de-multiplexer 155, the ODU receiver de-framer 160, and the OTN de-mapper 165 perform de-framing, de-multiplexing, and de-mapping operations on the OTN framed data stream to extract the CBR client data stream from the second framed OTN data stream. The transmit SerDes 170 receives the extracted or recovered second CBR client data stream from the OTN de-mapper 165 and forwards the extracted or recovered second CBR client data stream serially to another network element (not shown) supporting the CBR client protocol.

The OTN wrapping and unwrapping operations performed by the OTN device 100 induce a total delay consisting of a fixed delay (i.e. static delay) and a variable delay (i.e. dynamic delay) on each client bit of a CBR client data stream as each client bit passes through the OTN wrapping data path 105 of one network element (NE) and the OTN unwrapping data path 110 of a peer NE at the opposite end of the network. Because the client data stream is a CBR client data stream prior to OTN mapping, OTN multiplexing, and OTN framing operations, and is the same CBR client data stream after OTN de-framing, OTN de-mapping, and OTN de-multiplexing operations, an overall end-to-end delay (i.e., the total wrapping delay plus the total unwrapping delay) through the OTN mapper 120, the ODU transmit framer 125, the OTN multiplexer 130, the OTU/ODU transmit framer 135 of one NE and, the OTU/ODU receiver framer 150, the OTN de-multiplexer 155, the ODU receiver framer 160, and the OTN de-mapper 165 of a peer NE at the opposite end of the network is constant.

In other words, the sum of the dynamic delay induced on a CBR client data stream by the OTN wrapping operation (i.e., the wrapping dynamic delay) and the dynamic delay induced on a CBR client data stream by the OTN unwrapping operations (i.e., the unwrapping dynamic delay) is constant. This is described in further detailed below. Thus, the wrapping and unwrapping dynamic delays induced on a CBR client data stream by the OTN wrapping and OTN unwrapping operations may be converted into a predefined static delay. For the purposes of the present disclosure, the relationship of the wrapping dynamic delay and the unwrapping dynamic delay is termed complementary (i.e., the wrapping dynamic delay+the unwrapping dynamic delay=predefined static delay). The dynamic wrapping and unwrapping delays are an intrinsic property of the OTN protocol utilized to transport a CBR client data stream over OTN and are the same for all implementations of the particular OTN wrapping and OTN unwrapping operations.

Figure 2:
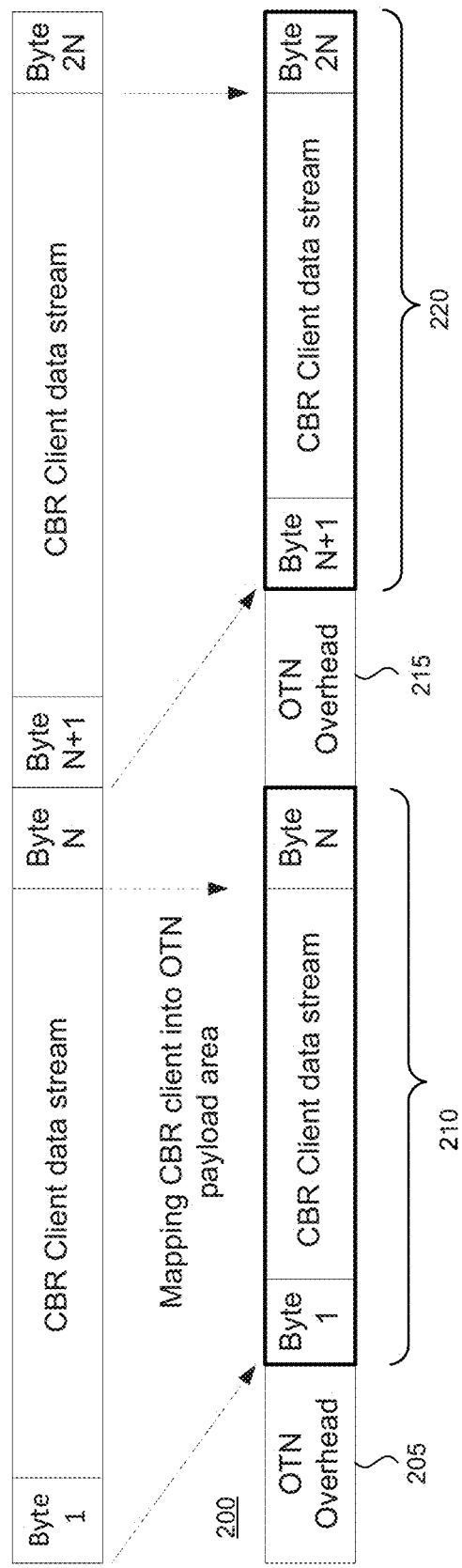
FIG. 2 is a block diagram that illustrates an example of framing and mapping of a CBR client data stream into an OTN frame.

Referring now to FIG. 2, an example of framing and mapping of a CBR client data stream into an OTN frame 200 is shown. In the example shown in FIG. 2, the OTN frame 200 includes two consecutive rows, in which a first row has OTN Overhead 205 and a payload 210, a second row has OTN Overhead 215, and a payload 220. As shown in FIG. 2, Bytes 1 to N of a CBR client data stream received by the OTN wrapping device 100 in the OTN wrapping data path 105 are mapped into the payload 210 of the first row of the OTU frame 200 and bytes N+1 to 2N of the CBR client data stream are mapped into the payload 220 of the second row of the OTU frame 200.

Figure 3:
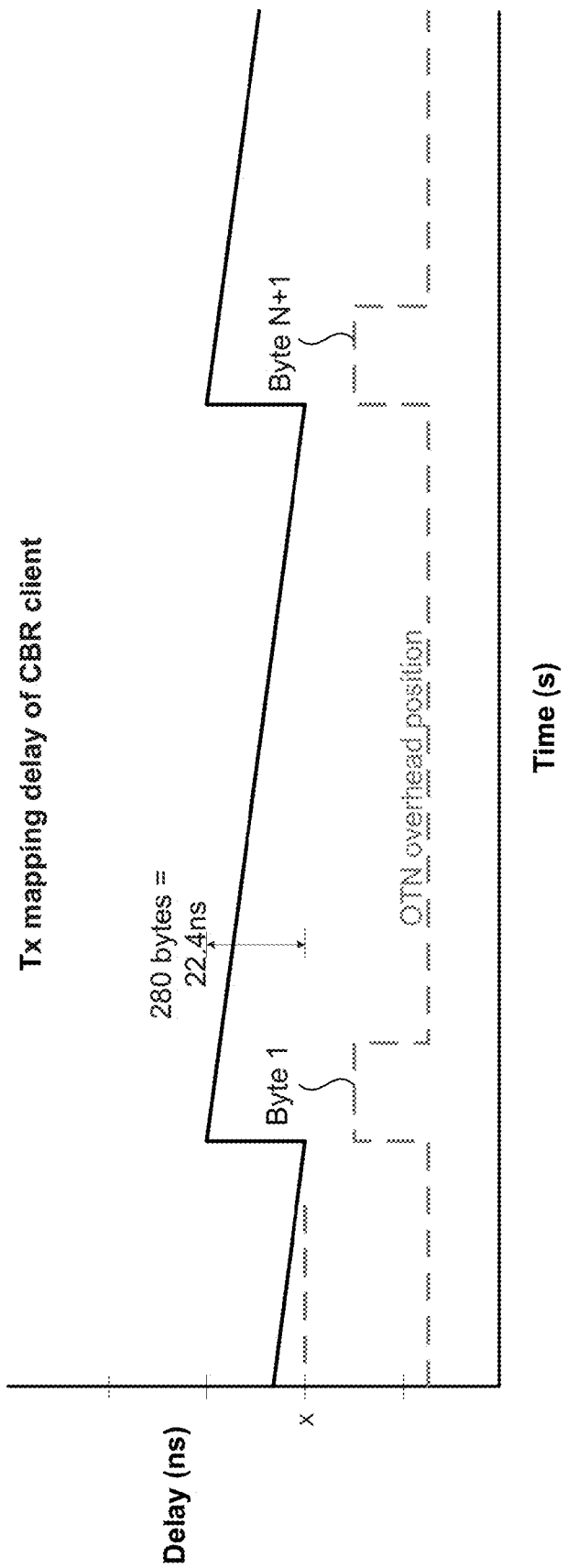
FIG. 3 is a graph illustrating an example of the delay induced on a CBR client data stream when the CBR client data stream is framed and mapped into an OTN frame.

Referring to FIG. 3, an example of a delay pattern resulting from the framing and mapping operations of FIG. 2 is shown. FIG. 3 shows that bytes of the CBR client data stream that are received by the OTN wrapping device 100 during OTN overhead periods during framing and mapping operations experience more delay than bytes of CBR client data stream that arrive during OTN payload times. For example, Byte 1 and Byte N+1, which both arrive at the beginning of the OTN overhead columns must wait the longest time before the first opportunity arrives for them to be mapped into the OTN payload 210. Byte N and Byte 2N, which arrive at the end of the OTN payload, must wait the shortest time before being mapped into the OTN payload 220. The bytes in-between Byte 1 and Byte N, and between Byte N+1 and Byte 2N of the CBR client data stream, experience a linearly decreasing delay. In the example shown in FIG. 2, the OTN Overhead 205, 215 has a duration of 280 bytes (22.4 ns).

Figure 4:
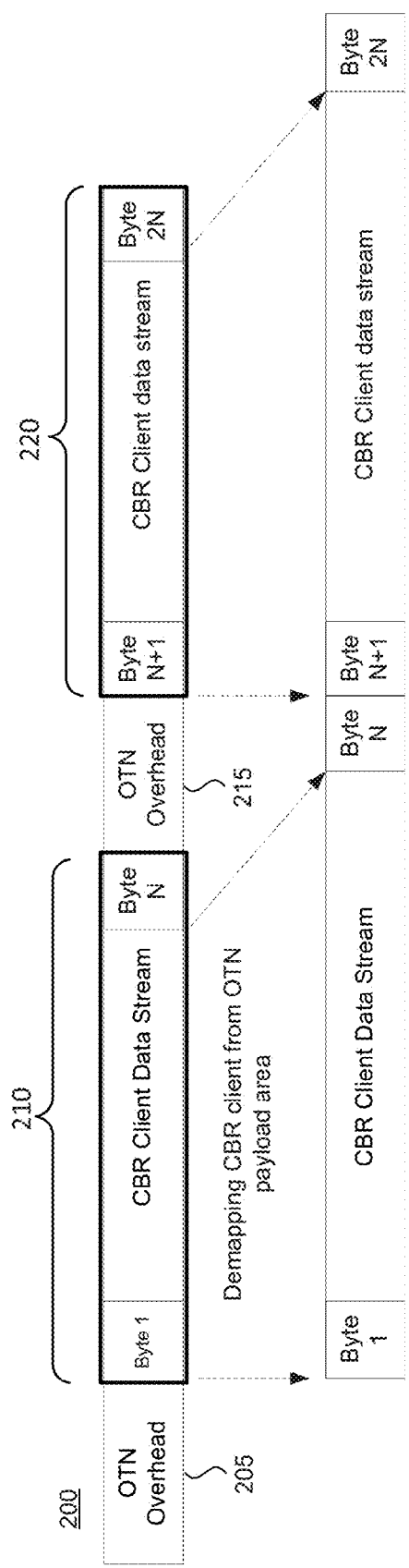
FIG. 4 is a block diagram that illustrates an example of the de-framing and de-mapping of a CBR client data stream from an OTN frame.

Referring now to FIG. 4, an example of de-framing and de-mapping a CBR client data stream from the OTN frame 200 is shown. As shown in FIG. 4, byte 1 and byte N of the CBR client data stream are de-mapped from the OTN payload 210 of the OTN frame 200 and byte N+1 to byte 2N of the CBR client data stream are de-mapped from the payload 220 of the OTN frame 200. Byte N and byte 2N now experience the most delay and byte 1 and byte N+1 of the CBR client data stream experience the least delay.

Figure 5:
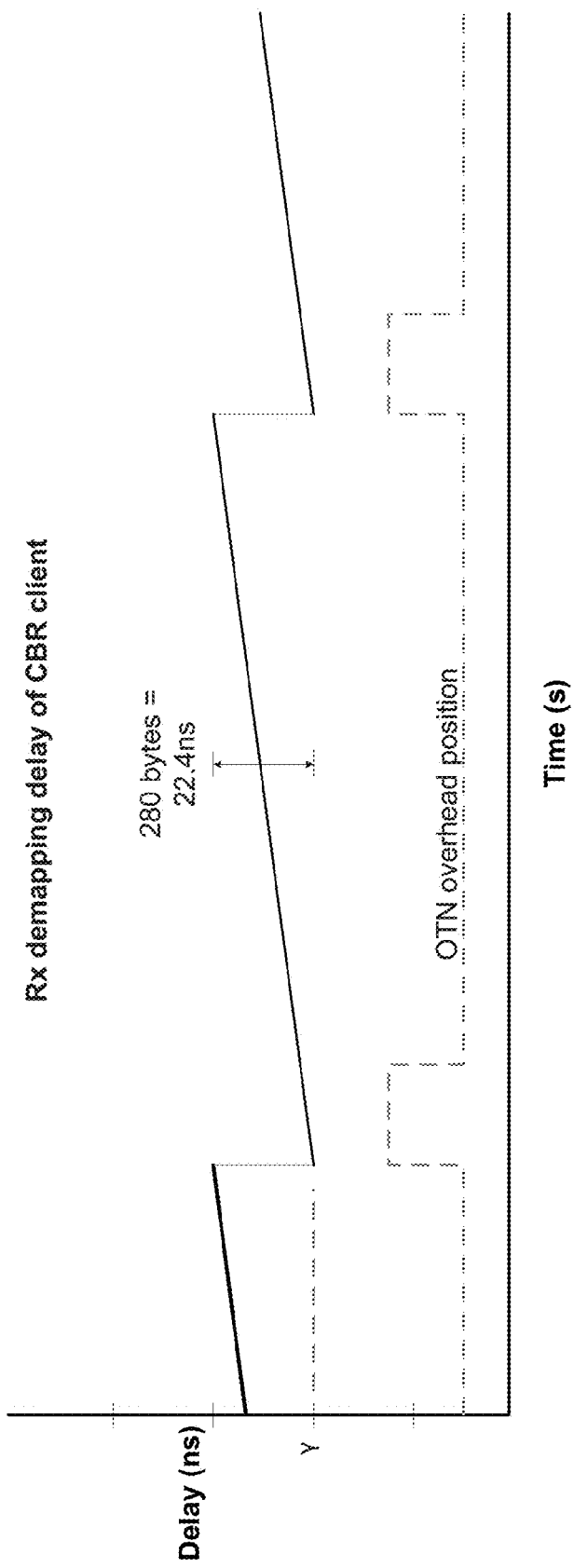
FIG. 5 is a graph illustrating an example of the delay induced on a CBR client data stream when the CBR client data stream is de-mapped and de-framed from an OTN frame.

Referring to FIG. 5, an example of a delay pattern resulting from de-framing and de-mapping operations of FIG. 4 is shown. FIG. 5 shows the CBR client data stream relative to the OTN overhead bytes. During the de-framing and de-mapping operations, Byte N and Byte 2N of the CBR client data stream experience the most delay and Byte 1 and Byte N+1 of the CBR client data stream experience the least delay. During the OTN payload bytes 210, 220, the CBR client data stream is delivered at a faster rate than the output CBR client stream's average rate. Thus, the incoming CBR data stream must be stored in a buffer while waiting for its turn to be transmitted on the output CBR client port. Because of this waiting time, the incoming bytes of the CBR client data stream experience a range of delays depending on a particular byte's location within the row of an OTN frame. When an OTN overhead byte is received, no CBR client data arrives into the buffer, however, the output CBR client data stream continues to be transmitted. During this time, the buffer will drain and the delay on the CBR client stream will decrease. In the example shown in FIG. 5, the OTN frame overhead has a duration of 280 bytes (22.4 ns).

Figure 6:
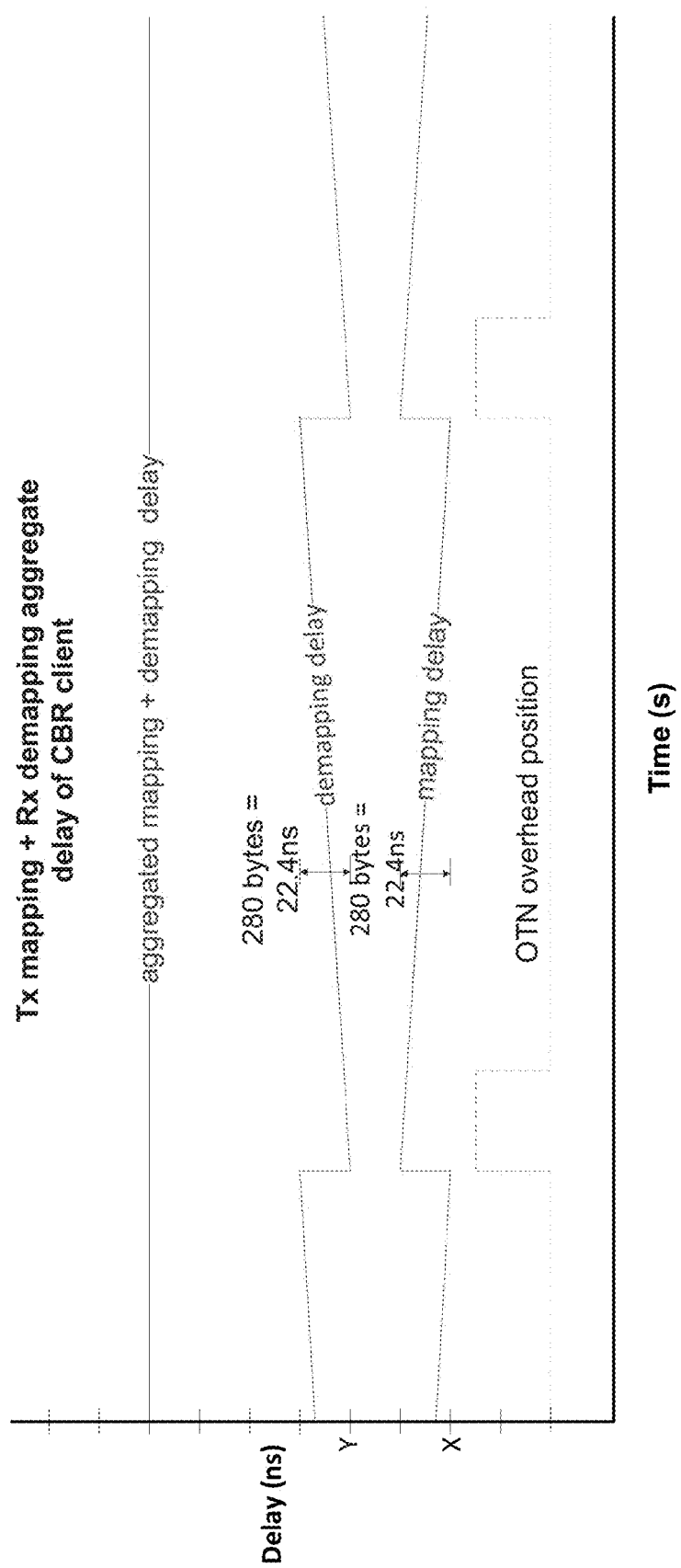
FIG. 6 is a graph illustrating the delay from both FIG. 3 and FIG. 5.

FIG. 6 shows a sum of the delays from the framing and mapping operations shown in FIG. 3 and the de-framing and de-mapping operations shown in FIG. 5. For a CBR client data stream, the sum of the delays is a constant value because the dynamic delays induced on the CBR client data stream during framing and mapping operations are counterbalanced by the dynamic delays induced on the CBR client data stream during de-framing and de-mapping operations. This basic principle, and a corresponding triangular delay pattern, applies for any type of OTN mapping, de-mapping, multiplexing, or de-multiplexing, Asynchronous Mapping Procedure (AMP), Bit Synchronous Mapping Procedure (BMP), and Generic Mapping Procedure (GMP).

Figure 7:
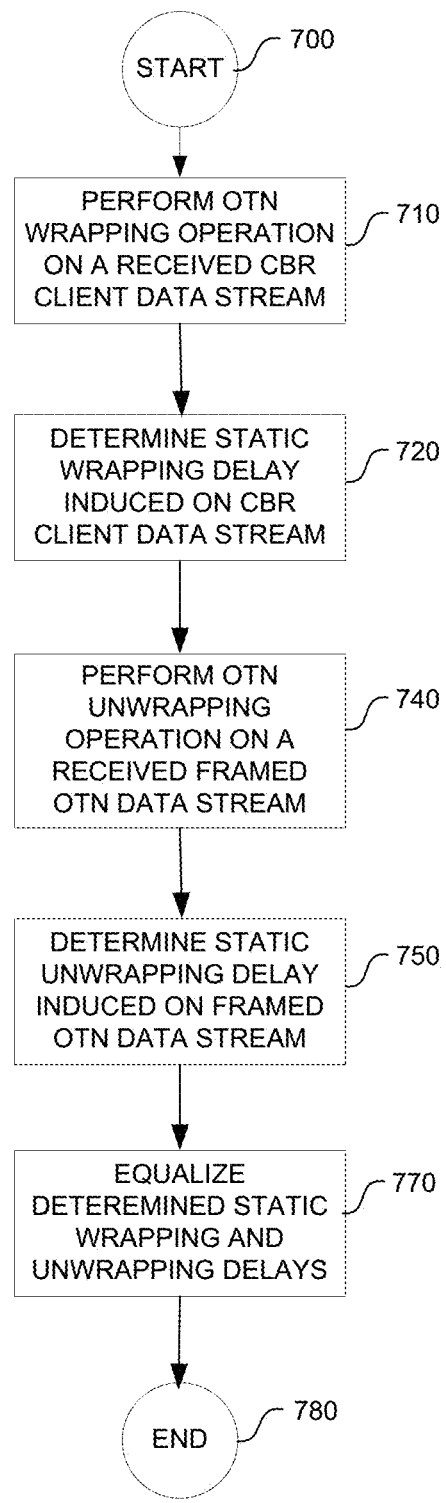
FIG. 7 is a flowchart illustrating a method of facilitating transport of symmetric client data streams over an OTN in accordance with an embodiment of the present disclosure.

Referring now to FIG. 7, a flowchart illustrating a method of controlling latency of constant bit rate (CBR) client data streams transported over OTN in accordance with the present disclosure is shown. The method may be carried out by software executed, for example by, a processor 180 (FIG. 1) of the OTN wrapping device 100. Coding of software for carrying out such a method is within the scope of a person of ordinary skill in the art given the present description. The method may contain additional or fewer processes than shown and/or described. Computer-readable code executable by the processor to perform the method may be stored in a computer-readable medium, for example, the memory 175 (FIG. 1)

The method begins at 700 where the OTN wrapping device 100 receives a first CBR client data stream from a network element. The method then proceeds to 710 where an OTN wrapping operation is performed on the first CBR client data stream by the OTN wrapping device 100 (FIG. 1) to form a first framed OTN data stream that includes the first CBR client data stream. The method then proceeds to 720, where a static wrapping delay induced on the first CBR client data stream by the OTN wrapping operation is determined.

In an embodiment, the OTN wrapping operation comprises an aggregate OTN wrapping operation that includes a plurality of cascaded OTN wrapping operations, and the OTN unwrapping operation comprises an aggregate OTN unwrapping operation that includes a plurality of cascaded OTN unwrapping operations. Each of the plurality of cascaded OTN wrapping operations is an individual OTN wrapping operation and each of the plurality of cascaded OTN unwrapping operations is an individual OTN unwrapping operation. The method determines a static wrapping delay by determining a static wrapping delay induced on the first CBR client data stream for each of the plurality of cascaded OTN wrapping operations and aggregating the static wrapping delay determined for each of the plurality of cascaded OTN operations. The method also determines a static unwrapping delay by determining a static unwrapping delay induced on the second CBR client data stream for each of the plurality of cascaded OTN unwrapping operations and aggregating the static unwrapping delay determined for each of the plurality of cascaded OTN operations.

In an embodiment, the static wrapping delay is determined at 720 by measuring a total wrapping delay induced on the CBR client data stream by the OTN wrapping operation, and determining an intrinsic dynamic wrapping delay associated with the OTN wrapping operation. The static wrapping delay is obtained by subtracting the obtained intrinsic dynamic delay from the measured total delay. In an embodiment, the total wrapping total delay may be measured by: replacing a predetermined number of client data bits in the first CBR client data stream with a predetermined pattern of data bits; detecting, at an input of the OTN wrapping device, the predetermined pattern of data bits; recording a first time when the predetermined pattern of data bits is detected; detecting, at an output of the OTN wrapping operation, the predetermined pattern of data bits in the first framed OTN data stream; recording a second time when the predetermined pattern of data bits in the framed OTN data stream is detected; subtracting the first time from the second time; and restoring the predetermined number of client data bits in the first framed OTN data stream at the output of the OTN wrapping operation.

In an embodiment, the intrinsic dynamic delay is determined by detecting, at the output of the OTN wrapping operation, a position of the predetermined pattern of data bit in an OTN frame of the first framed OTN data stream, and obtaining the intrinsic dynamic delay for the detected position.

In an alternative embodiment, the total wrapping delay may be measured by: identifying a set of data bits in the CBR client data stream; detecting, at an input of the OTN wrapping device, the set of data bits; recording a first time when the set of data bits is detected; detecting, at an output of the OTN wrapping operation, the set of data bits in the framed OTN data stream; recording a second time when the set of data bits in the first framed OTN data stream is detected; and subtracting the first time from the second time. In an embodiment, the set of data bits identified in the CBR client data stream may be a naturally occurring pattern of data bits in the CBR client data stream.

After the static wrapping delay is determined at 720, the first framed OTN data stream is transmitted by the OTN device to another OTN element or endpoint and the method proceeds to 740. At 740, an OTN unwrapping operation is performed on a second framed OTN data stream that is received from another network element by the OTN wrapping device 100 to extract a second CBR client data stream from the second framed OTN data stream. The method then proceeds to 750. At 750, a static unwrapping delay induced on the second framed OTN data stream by the OTN unwrapping operation is determined, and the extracted second CBR client data stream is transmitted to another OTN element or endpoint.

In an embodiment, the static unwrapping delay is determined at 750 by measuring a total unwrapping delay induced on the second CBR data stream by the OTN unwrapping operation and determining an intrinsic dynamic unwrapping delay induced on the second CBR client data stream associated with the OTN unwrapping operation. The static unwrapping delay is then obtained by subtracting the determined intrinsic dynamic unwrapping delay from the total unwrapping delay. In an embodiment, the total unwrapping delay may be measured by: replacing a predetermined number of client data bits of the second framed OTN data stream with a predetermined pattern of data bits; detecting, at an input of the OTN unwrapping device, the predetermined pattern of data bits; recording a first time when the predetermined pattern of data bits is detected; detecting, at an output of the OTN unwrapping device, the predetermined pattern of data bits; recording a second time when the predetermined pattern of data bits is detected; subtracting the first time from the second time, and restoring the predetermined number of client data bits back into the second CBR client data stream at the output of the OTN unwrapping operation. In an embodiment, the intrinsic dynamic unwrapping delay may be determined by: detecting, at the input of the OTN unwrapping operation, a position of the predetermined pattern of data bits in the second framed OTN data stream; and determining the intrinsic dynamic delay for the position.

After the static unwrapping delay is determined at 750, the second CBR client data stream is transmitted by the OTN device to another OTN element or endpoint and the method proceeds to 770. At 770, the determined static wrapping delay and the determined static unwrapping delay are equalized by adjusting, at the OTN wrapping device, at least one of the static wrapping delay and the static unwrapping delay. In an embodiment, the determined static wrapping delay and the determined static unwrapping delay are equalized at 770 based on a difference between the static wrapping delay and the static unwrapping delay. In an alternative embodiment, the determined static wrapping delay and the determined static unwrapping delay are equalized at 770 by comparing both the static wrapping delay and the static unwrapping delay to a predetermined value. When the static wrapping delay and the predetermined value are unequal, the static wrapping delay is adjusted to match the predetermined value. When the static unwrapping delay and the predetermined value are unequal, the static unwrapping delay is adjusted to match the predetermined value. After the determined static wrapping delay and the determined static unwrapping delay are equalized, the method proceeds to 780 where the method ends.

Figure 8:
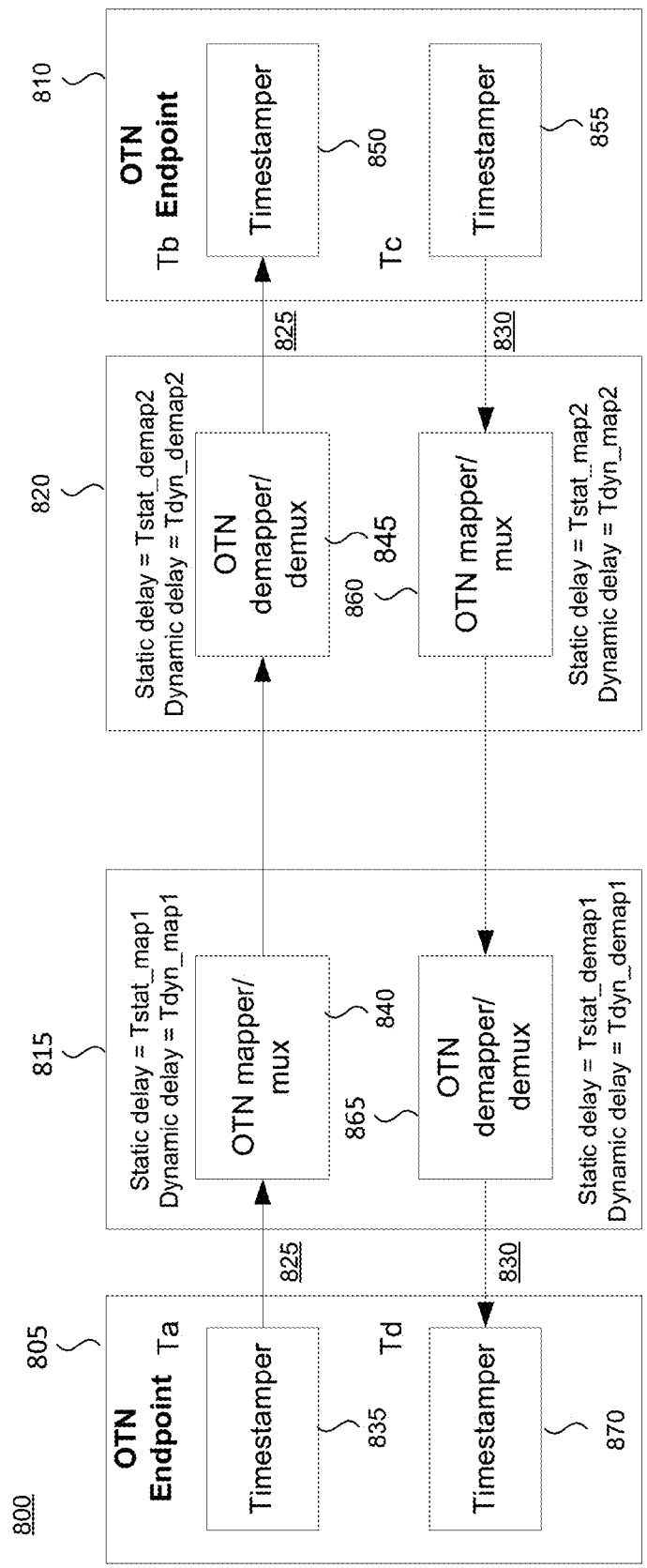
FIG. 8 is a block diagram showing an OTN network for transporting multiple client data streams in accordance with an embodiment of the present disclosure.

Referring now to FIG. 8, a block diagram of another embodiment of an OTN for transporting multiple CBR client data streams is shown. In the embodiment shown in FIG. 8, the OTN 800 includes two network endpoints 805, 810 for receiving and transmitting CBR client data streams over the OTN 800. In an embodiment, the network endpoints 805, 810 may be IEEE 1588 network endpoints. In an alternative embodiment, the two network endpoints may be CPRI network endpoints.

The OTN 800 also includes two OTN wrapping devices 815, 820. The first OTN wrapping device 815 is connected to the first network endpoint 805 and the second OTN wrapping device 820 is connected to the second network endpoint 810. The first and second OTN wrapping devices 815, 820 are also connected together. Each OTN wrapping device 815, 820 performs OTN wrapping and unwrapping operations on CBR client data streams from the first and second network endpoints 805, 810.

The embodiment shown in FIG. 8 illustrates a forward data path 825 and an reverse data path 830 between first and second network endpoints 805 and 810. The forward data path 825 includes a first timestamper 835 of the first network endpoint 805, an OTN framer/multiplexer/mapper 840 of the first OTN wrapping device 815 that performs an OTN wrapping operation on a received CBR client data stream, an OTN de-framer/de-multiplexer/de-mapper 845 of the second OTN wrapping device 820 that performs an OTN unwrapping operation on a OTN frame received from the first OTN wrapping device 815, and a first timestamper 850 of the second network endpoint 810. Thus, the forward data path 825 includes an OTN wrapping data path 185 (FIG. 1) of the OTN framer/multiplexer/mapper 840 and an OTN unwrapping data path 190 (FIG. 1) of the OTN de-framer/de-multiplexer/de-mapper 845. The reverse data path 830 includes a second timestamper 855 of the second network endpoint 810, an OTN framer/multiplexer/mapper 860 of the second OTN wrapping device 820 that performs an OTN wrapping operation on a received CBR client data stream, an OTN de-framer/de-multiplexer/de-mapper 865 of the first OTN wrapping device 815 that performs an OTN unwrapping operation on a OTN frame received from the second OTN wrapping device 820, and a second timestamper 870 of the first network endpoint 815. Thus, the reverse data path 830 includes an OTN wrapping data path 185 (FIG. 1) of the OTN framer/multiplexer/mapper 860 and an OTN unwrapping data path 190 (FIG. 1) of the OTN de-framer/de-multiplexer/de-mapper 865.

In the forward data path 825, the delay on a selected bit, i, is calculated by:

$$\text{forward\_delay} = Tb[i] - Ta[i] = (T\text{stat\_map1} + T\text{dyn\_map1}[i]) + (T\text{stat\_demap2} + T\text{dyn\_demap2}[i]) \quad \text{(Equation 1)}$$

where i represents any selected client bit, passing through a set of OTN wrapping and unwrapping operations, Ta is the departure timestamp of bit i from the network endpoint 805, and Tb is the arrival timestamp of bit i at the network endpoint 810.

In the reverse data path 830, the delay on a selected bit, j, is calculated by:

$$\text{reverse\_delay} = Td[j] - Tc[j] = (T\text{stat\_map2} + T\text{dyn\_map2}[j]) + (T\text{stat\_demap1} + T\text{dyn\_demap1}[j]) \quad \text{(Equation 2)}$$

where j represents any selected bit in the CBR client data stream, passing through a set of complementary OTN wrapping and unwrapping operations, Tc is the departure timestamp of bit j from the network endpoint 810, Td is the arrival timestamp of bit j at the OTN network endpoint 805.

Each static delay shown in the OTN 800, Tstat_map1, Tstat_demap2, Tstat_map2, and Tstat_demap1, is implementation dependent and is the same for every bit of the CBR client data stream. These constant delays may result from, for example, pipeline stages in a logical implementation of the OTN 800. In order for the OTN 800 to find the delay asymmetry in its forward and reverse data paths 825, 830, these delays must be measured or, by some other method, be known a priori.

The relationships between the delays induced on the CBR client data stream by the dynamic OTN wrapping and unwrapping operations are expressed in Equation 3 and Equation 4 below. The dynamic wrapping and unwrapping delays are defined by the protocol definition for the mapping, de-mapping, multiplexing, de-multiplexing operations and are implementation independent. Because these dynamic wrapping and unwrapping delays are complementary, the sum of the dynamic wrapping and unwrapping delays become a pre-determined static delay as noted above. This static delay from the OTN wrapping and OTN unwrapping operations is the same for all client bits. The dynamic delay relationship for one set of OTN wrapping and unwrapping operations is given by:

$$T\text{dyn\_map1}[i] + T\text{dyn\_demap2}[i] = T\text{dyn\_map2}[j] + T\text{dyn\_demap1}[j] = N \quad \text{(Equation 3)}$$

where i and j represent any selected client bit, passing through a set of complementary OTN wrapping and OTN unwrapping operations, and N is the static delay of the OTN wrapping and OTN unwrapping operations and is a constant value that may be mathematically determined based on the type of OTN wrapping that is being performed.

From Equation 3, Equation 4 (shown below) is derived by selecting bits i and j in the client data stream that experience the minimum and the maximum dynamic delays. The minimum and maximum dynamic delay relationship of complementary OTN wrapping and unwrapping operations is given by:

$$T\text{dyn\_map1}_{min} + T\text{dyn\_demap2}_{max} = T\text{dyn\_map1}_{max} + T\text{dyn\_demap2}_{min} = T\text{dyn\_map2}_{min} + T\text{dyn\_demap1}_{max} = T\text{dyn\_map2}_{max} + T\text{dyn\_demap1}_{min} = N \quad \text{(Equation 4)}$$

The values in Equation 4 represent the minimum and maximum dynamic delay seen by any bit of the CBR client data stream in the corresponding OTN wrapping and unwrapping operations.

If bits i and j are selected to match those used in Equation 4 (i.e. the ones that experience the minimum or maximum delays through each OTN wrapping and unwrapping operation), the total wrapping and unwrapping delay in the forward data path 825 and the total wrapping and unwrapping delay in the reverse data path 830 from Equations 1 and 2 may be rewritten as:

$$\text{forward\_delay} = T\text{stat\_map1} + T\text{stat\_demap2} + N \quad \text{(Equation 5)}$$

$$\text{reverse\_delay} = T\text{stat\_map2} + T\text{stat\_demap1} + N \quad \text{(Equation 6)}$$

Because the OTN wrapping and unwrapping operations are complementary, the dynamic delay of the same operation is identical in the forward and reverse data paths 825, 830. These relationships are shown in Equations 7a, 7b, 7c, and 7d.

$$T\text{dyn\_map1}_{min} = T\text{dyn\_map2}_{min} \quad \text{(Equation 7a)}$$

$$T\text{dyn\_map1}_{max} = T\text{dyn\_map2}_{max} \quad \text{(Equation 7b)}$$

$$T\text{dyn\_demap1}_{min} = T\text{dyn\_demap2}_{min} \quad \text{(Equation 7c)}$$

$$T\text{dyn\_demap1}_{max} = T\text{dyn\_demap2}_{max} \quad \text{(Equation 7d)}$$

The values in Equations 7a, 7b, 7c, and 7d represent the minimum and maximum dynamic delay seen by any bit of the CBR client data stream in the corresponding OTN wrapping and unwrapping operations.

By combining Equation 4 and Equations 7a, 7b, 7c, and 7d, the relationships shown in Equations 8a, 8b, 8c, 8d may be derived. Equations 8a, 8b, 8c, 8d show that the dynamic delays associated with a set of complementary wrapping and unwrapping operations may be derived from the minimum and maximum dynamic delay from any one OTN wrapper device 815, 820.

$$T\text{dyn\_map1}_{min} + T\text{dyn\_demap1}_{max} = N \quad \text{(Equation 8a)}$$

$$T\text{dyn\_map1}_{max} + T\text{dyn\_demap1}_{min} = N \quad \text{(Equation 8b)}$$

$$T\text{dyn\_map2}_{min} + T\text{dyn\_demap2}_{max} = N \quad \text{(Equation 8c)}$$

$$T\text{dyn\_map2}_{max} + T\text{dyn\_demap2}_{min} = N \quad \text{(Equation 8d)}$$

Thus, the intrinsic static delay, N, induced upon the CBR client data stream as the CBR client data stream passes through one set of OTN wrapping and unwrapping operations in the OTN wrapping and OTN unwrapping data paths of the first OTN wrapper device 815, may be derived without knowledge of the second OTN wrapping device 820 at another end of a communication link. This intrinsic static delay is implementation independent and may be obtained mathematically from the OTN protocol specification dynamic wrapping and unwrapping delays.

Using Equation 4, the relationships in Equation 9a and 9b may be obtained. Equations 9a and 9b exhibit the concept of the counter-balancing dynamic delays in the set of OTN wrapping and unwrapping operations. Equations 9a and 9b also show that the intrinsic static delay is evenly shared between the two halves of the OTN wrapping and OTN unwrapping operations.

$$T\text{dyn\_map1}_{max} - T\text{dyn\_map1}_{min} = T\text{dyn\_demap1}_{max} - T\text{dyn\_demap1}_{min} \quad \text{(Equation 9a)}$$

$$T\text{dyn\_map2}_{max} - T\text{dyn\_map2}_{min} = T\text{dyn\_demap2}_{max} - T\text{dyn\_demap2}_{min} \quad \text{(Equation 9b)}$$

Thus, the mapping and multiplexing operation and the de-mapping and de-multiplexing operation can each be deemed to contribute a half of the end-to-end intrinsic static delay (i.e. N/2) of the OTN wrapping and OTN unwrapping operations. Each OTN wrapping and unwrapping operations aggregate static delay is calculated as per Equations 10a, 10b, 10c, and 10b shown below.

$$\text{device1\_map\_forward\_delay} = T\text{stat\_map1} + N/2 \quad \text{(Equation 10a)}$$

$$\text{device1\_demap\_reverse\_delay} = T\text{stat\_demap1} + N/2 \quad \text{(Equation 10b)}$$

$$\text{device2\_demap\_forward\_delay} = T\text{stat\_demap2} + N/2 \quad \text{(Equation 10c)}$$

$$\text{device2\_map\_reverse\_delay} = T\text{stat\_map2} + N/2 \quad \text{(Equation 10d)}$$

Equations 10a, 10b, 10c, 10d show that each OTN wrapping device may obtain all the information necessary to determine and fix its own asymmetry without knowledge of other OTN wrapping devices in the forward and reverse data paths 825, 830. For example, OTN wrapping device 815 may determine Tstat_map1 and Tstat_demap1 without knowledge of OTN wrapping device 820. OTN wrapping device 820 may determine Tstat_map2 and Tstat_demap2 without knowledge of OTN wrapping device 815. The intrinsic static delay, N, is invariable for a given OTN wrapping operation or OTN unwrapping operation. Thus, the intrinsic static delay only contributes to the delay magnitude but does not contribute to the delay asymmetry.

If every OTN wrapping device in an OTN uses this information to make itself symmetrical, and if the optical fibre or electrical cable connecting OTN wrapping devices is also symmetrical, then the forward and reverse data paths for the entire OTN will be symmetrical.

The dynamic delay induced upon a specific client data bit by an individual OTN wrapping operation or OTN unwrapping operation (or by several OTN wrapping operations or several OTN unwrapping operations), whose dynamic delay patterns do not shift past each other, may be accurately determined mathematically from the client bit's location within the OTN frame. This allows a single delay measurement to uniquely quantify both the dynamic delay and the implementation specific static delay components and thus, reduces the number of measurements required to characterize the complete delay of the OTN wrapping and unwrapping operations.

For any OTN wrapping or OTN unwrapping operation, the dynamic delay may be determined based on the location of the client payload bits within the OTN frame. For asynchronous wrapping operations, such as GMP or AMP mapping and multiplexing, the number of client payload bits carried within one OTN frame changes based on the rate of the client data stream relative to the OTN data stream. The OTN frame's justification bytes may carry client payload in one frame and OTN stuff bytes in another frame. Typically, only a few justification byte patterns are possible for any given OTN multiplexing or mapping operation.

It is noted that an intrinsic Forward Error Correction decoding delay, which exists at both network endpoints 815, 820, and thus, inherently, must already be accounted for in the OTN 800, is inherently very large. In the method of the present disclosure, accounting for the intrinsic Forward Error Correction decoding delay unnecessarily burdens the OTN wrapping and OTN unwrapping operations. Thus, the intrinsic delay associated with OTN Forward Error Correction decoding in the OTN unwrapping operation is excluded from the measurement of the total unwrapping delay.

Figure 9:
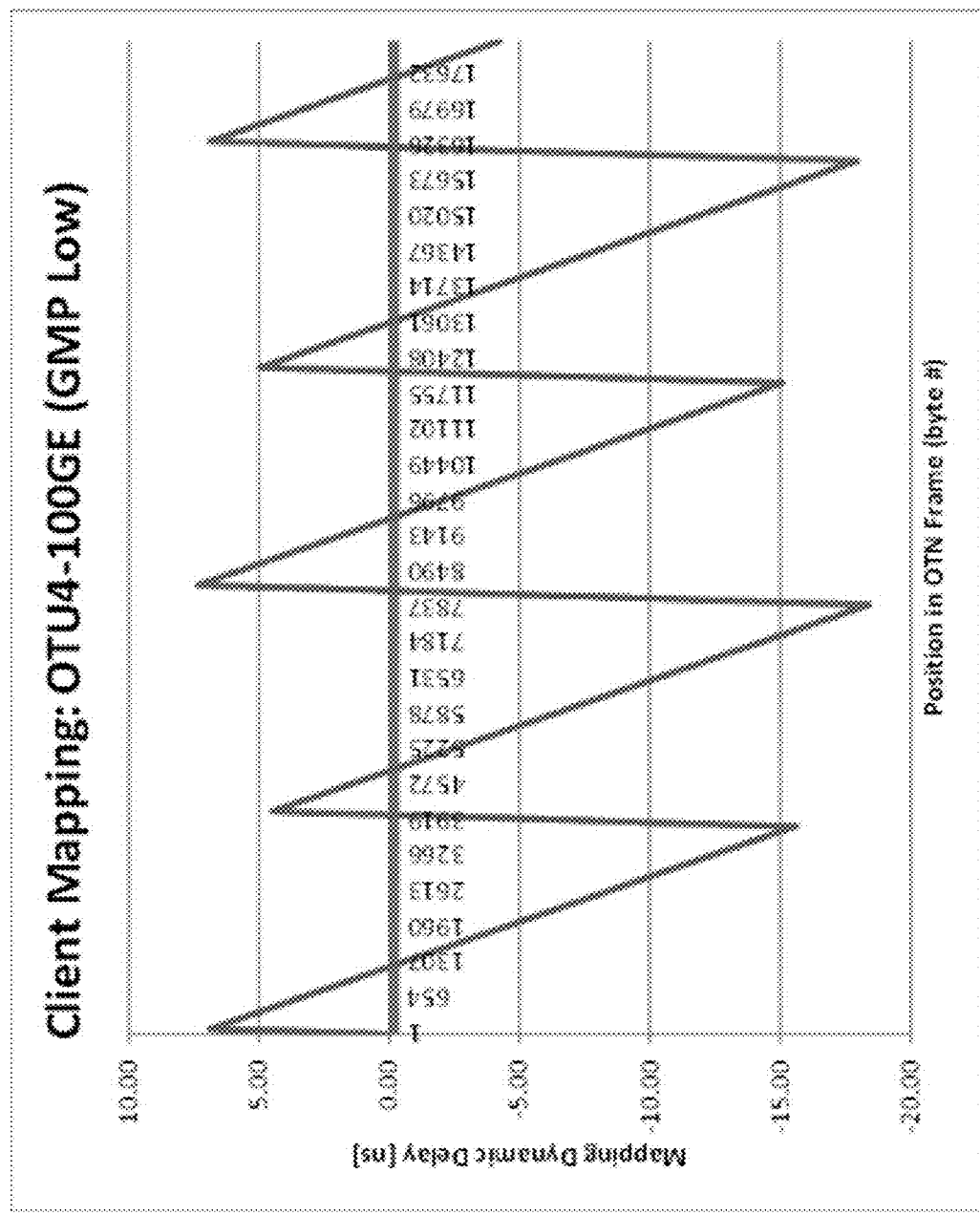
FIG. 9 is a graph illustrating an example of the dynamic delay when a 100 Gigabit Ethernet (GE) client data stream is Generic Mapping Procedure (GMP)-mapped into an Optical Transport Unit (OTU) 4 frame.
Figure 10:
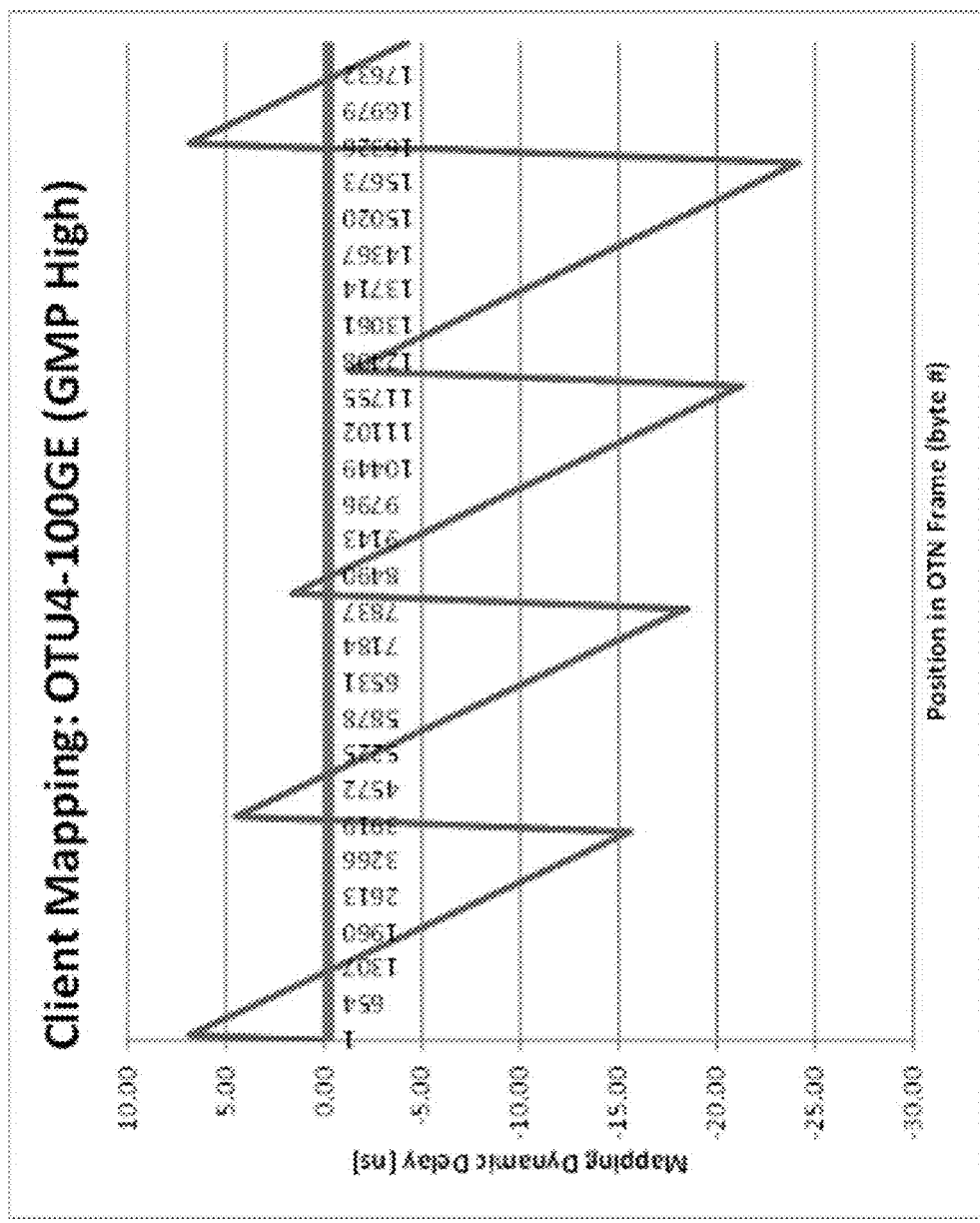
FIG. 10 is a graph illustrating another example of the dynamic delay when a 100 GE client data stream is GMP-mapped into an OTU4 frame.

FIG. 9 and FIG. 10 are graphs showing two different dynamic mapping delays that occur in the same implementation when a 100GE client data stream is GMP-mapped into an OTU4. The delay pattern shown in FIG. 9 illustrates a scenario in which the GMP justification control values provide fewer data byte opportunities (and more stuff byte opportunities) per frame than the scenario illustrated in FIG. 10.

The X-axis of the graphs shown in FIG. 9 and FIG. 10 shows the location of a byte of the 100GE client data stream in the OTU4 frame. The Y-axis shows the delay that is induced upon the 100GE client data stream byte. For the reasons explained above, this relationship is a property of the GMP mapping definition for the 100GE CBR client and is not dependent on how the GMP-mapping is implemented.

Now that the dynamic delay is calculated and known for all byte positions at which the client payload can reside, the implementation dependent static delay of the OTN wrapping and unwrapping operations may be determined by doing just one measurement.

For the case of cascaded OTN wrapping operations or cascaded OTN unwrapping operations, if the dynamic delay pattern of each OTN wrapping operation or unwrapping operation shifts, in time, past the dynamic delay pattern of the other OTN wrapping operation or unwrapping operation in the OTN wrapping data path or the OTN unwrapping data path, the maximum aggregated dynamic delay of the cascaded OTN wrapping or unwrapping operations is equal to the sum of the maximum dynamic delays of each individual OTN wrapping or unwrapping operation. Similarly, the minimum aggregated dynamic delay of the OTN wrapping or OTN unwrapping operations is equal to the sum of the minimum dynamic delays of each individual OTN wrapping or unwrapping operations. Thus, the aggregated OTN wrapping intrinsic static delay may be found using the intrinsic static delays of individual OTN wrapping operations and the aggregated OTN unwrapping intrinsic static delay may be found using the intrinsic static delays of individual OTN unwrapping operations.

Figure 11:
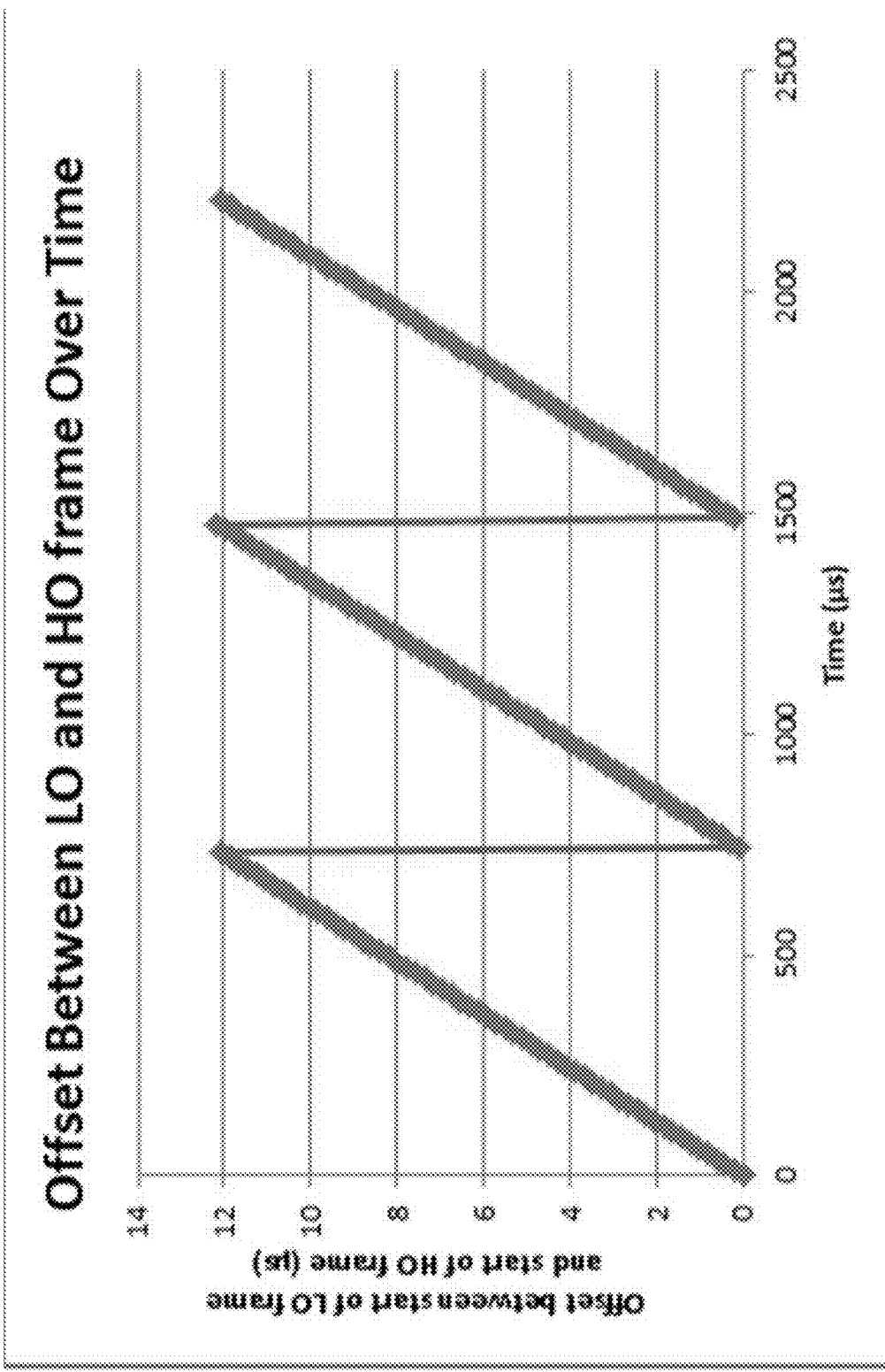
FIG. 11 is a graph illustrating a delay experienced by a selected byte within a high-order (HO) OTU2 relative to a selected byte within a low-order (LO) ODUFlex.

FIG. 11 is a graph showing the delay experienced by a selected bit within a high-order (HO) OTU2 relative to a selected bit within a low-order (LO) ODUFlex (carrying a CPRI Option 7 client data stream) that would be multiplexed into it. This triangular waveform shows that the bits shift relative to each other and periodically realign. The waveform will change slightly if ppm offsets are added to either or both the OTU2 and the ODUFlex.

Table 1 below shows the nominal frame periods for the various OTN hierarchical components. Table 1 shows that the frame rates are not integer multiples of each other so phase shifting between the low-order and the higher-order OTN component, similar to that shown in FIG. 11, will occur for any valid multiplexing hierarchical combination. This shows that the delay patterns of OTN wrapping operations will shift past each other. Thus, the maximum aggregated intrinsic delay of multiple cascaded OTN wrapping and unwrapping operations is simply the sum of the individual maximum intrinsic delays of the individual OTN wrapping and unwrapping operations. Similarly, the minimum aggregated intrinsic delay of multiple cascaded OTN wrapping and unwrapping operations is simply the sum of the individual minimum intrinsic delays of the individual OTN wrapping and unwrapping operations.

When this characteristic is combined with the characteristics defined in Equations 7a-7d and Equations 8a-8d, we can see that the intrinsic static delay of the aggregated OTN wrapping and unwrapping operations is equal to the sum of the intrinsic static delays of the individual OTN wrapping and unwrapping operations.

TABLE 1

OTUk/ODUk/OPUk Frame Periods

| OTU/ODU/OPU type | Period (rounded to 3 decimal places) |
|---|---|
| ODU0/OPU0 | 98.354 μs |
| OTU1/ODU1/OPU1 | 48.971 μs |
| OTU2/ODU2/OPU2 | 12.191 μs |
| OTU2e/ODU2e/OPU2e | 11.767 μs |
| OTU3/ODU3/OPU3 | 3.035 μs |
| OTU4/ODU4/OPU4 | 1.168 μs |
| OPUflex for CBR client data streams | 121856/client signal bit rate (μs, if the client signal bit rate is in units of Mbit/s) |

Figure 12:
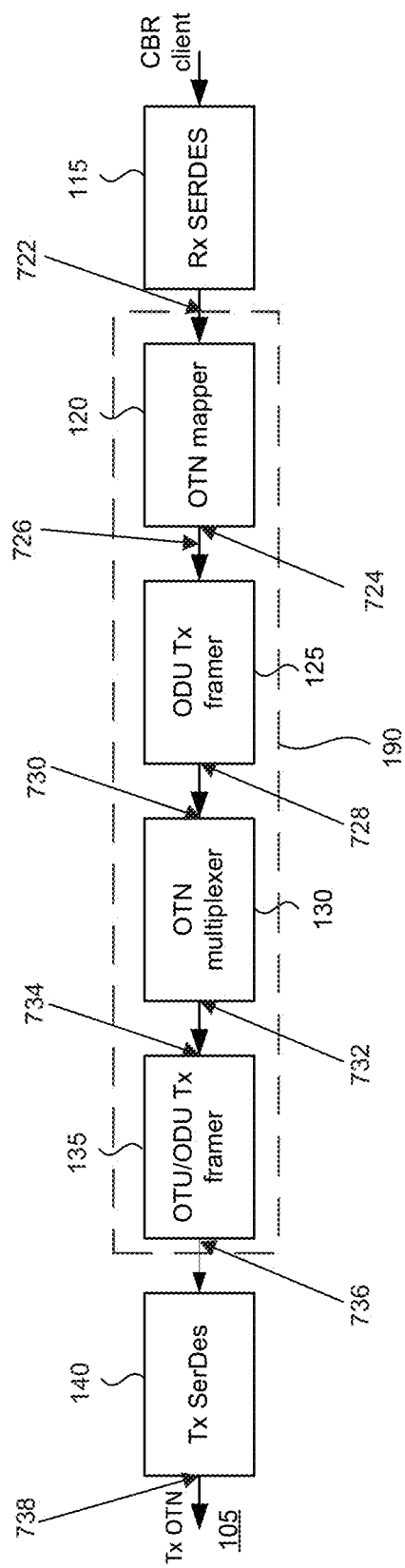
FIG. 12 is a block and flow diagram of the OTN wrapping data path of the OTN device 100 shown in FIG. 1 in accordance with an embodiment of the present disclosure.

Referring to FIG. 12, a block and flow diagram of the OTN wrapping data path 105 of FIG. 1 is shown. A method of determining the static wrapping delay at 720 of FIG. 7 in accordance with an embodiment of the present disclosure will now be described in further detail in relation to FIG. 12.

The method of determining the static wrapping delay begins at 722 by replacing a predetermined number of bits of the received first CBR client data stream with a predetermined pattern of data bits having a predefined delimiter at the input of the OTN mapper 120 and storing the respective replaced bits of the first CBR client data stream. Additionally, at 722, a first timestamp, TSTMP_1 is recorded when the predetermined number of bits of the received first CBR client data stream are replaced. In an embodiment, the predetermined pattern of data bits is 0xFFFF FFFF FFFF FFFF.

The method then proceeds to 724. At 724, when the predetermined pattern of data bits is detected at an output of the OTN mapper 120, a second timestamp TSTMP_2 and a bit position of the predetermined pattern of data bits in an OTN frame are recorded. The measured total delay through the OTN mapper 120 is then determined by subtracting TSTMP_1 from TSTMP_2. The static wrapping delay for the OTN mapper 120 is determined at 724 by subtracting an intrinsic dynamic delay associated with the OTN mapper 120 from the measured total delay and is recorded at 724 as the static wrapping delay of the OTN mapper 120, DLY_1. The intrinsic dynamic delay associated with the OTN mapper may be mathematically calculated from the recorded bit position in the OTN frame. The stored bits are then restored into the OTN frame at 724.

The method then proceeds to 726 to record a third timestamp, TSTMP_3 when a multi-frame pulse is detected at an input of the ODU transmit framer 125 and to 728 to record a fourth timestamp, TSTMP_4, when the multi-frame pulse is detected at an output of the ODU transmit framer 125. The static delay through the ODU transmit framer 125 is then determined at 728 by subtracting TSTMP_3 from TSTMP_4 and the determined static wrapping delay for the ODU transmit framer 125 is recorded as, DLY_2.

The method then proceeds to 730 to replace a predetermined number of bits of the mapped OTN data stream with the predetermined pattern of data bits having a predefined delimiter at the input of the OTN multiplexer 130, and to store the respective replaced bits of the mapped OTN data stream. A fifth timestamp, TSTMP_5 is recorded at 730 when the predetermined bits of the mapped OTN data stream are replaced.

The method then proceeds to 732. At 732, when the predetermined pattern of data bits is detected at an output of the OTN multiplexer 130, a sixth timestamp TSTMP_6 and a bit position of the predetermined pattern of data bits in the multiplexed OTN frame are recorded. The measured total delay through the OTN multiplexer 130 is then determined at 732 by subtracting TSTMP_5 from TSTMP_6. The static wrapping delay for the OTN multiplexer 130 is then determined at 732 by subtracting an intrinsic dynamic delay associated with the OTN multiplexer 130 from the measured total delay and is recorded as the static wrapping delay of the OTN multiplexer 130, DLY_3. The intrinsic dynamic associated with the OTN multiplexer 130 may be mathematically calculated from the recorded bit position of the predetermined pattern in the multiplexed OTN frame. The stored bits of the mapped OTN data stream are then restored at 732 into the multiplexed OTN frame.

The method then proceeds to 734 to record a seventh timestamp, TSTMP_7 when an occurrence of a multi-frame pulse is detected at the input of the OTU/ODU transmit framer 135 and then proceeds to 736. At 736, an eighth timestamp, TSTMP_8, is recorded when an occurrence of multi-frame pulse is detected at the output of the OTU/ODU transmit framer 135. The static delay through the OTU/ODU transmit framer 135 is determined at 736 by subtracting TSTMP_7 from TSTMP_8 and the determined static delay for the OTU/ODU transmit framer 135, is recorded at 736 as DLY_4.

The method then proceeds to 738 to determine the static wrapping delay for the OTN wrapping data path 105 by summing DLY_1, DLY_2, DLY_3, and DLY_4.

Figure 13:
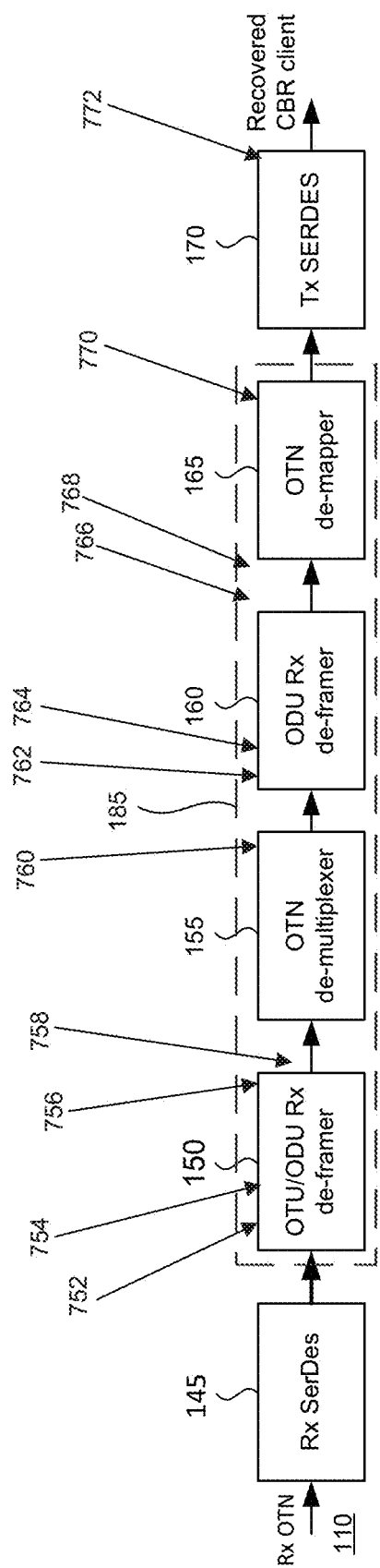
FIG. 13 is a block and flow diagram of the OTN unwrapping data path of the OTN device 100 shown in FIG. 1 in accordance with an embodiment of the present disclosure.

Referring to FIG. 13, a block and flow diagram of the OTN unwrapping data path 110 of FIG. 1 is shown. A method of determining the static unwrapping delay at 740 of FIG. 7 in accordance with an embodiment of the present disclosure will now be described in further detail in relation to FIG. 13.

The method of determining the static unwrapping delay begins at 752 by recording a static OTN frame alignment offset, DLY_A, at an output of the receive SerDes 145 and proceeds to 754. At 754, a timestamp, TSTMP_A, is recorded when the occurrence of a multi-frame pulse is detected at an input of the OTU/ODU receiver de-framer 150 and the method proceeds to 756. At 756, a second timestamp TSTMP_B, is recorded when the multi-frame pulse is detected at the output of the OTU/ODU receiver de-framer 150. The static unwrapping delay through the OTU/ODU receiver de-framer 150 is then determined at 756 by subtracting TSTMP_A from TSTMP_B and the determined static unwrapping delay for the OTU/ODU receiver de-framer 150 is recorded as DLY_B.

The method the proceeds to 758 to replace a predetermined number of bits in a framed OTN data stream with a predetermined pattern of data bits having a predefined delimiter at a predetermined byte position in a ODU frame at the input of the OTN de-multiplexer 155, and to store the bits of the OTN data stream. At 758, a timestamp, TSTMP_C is also recorded when the predetermined pattern of bits in a framed OTN data stream are replaced. In an embodiment, the predetermined pattern of data bits is 0xFFFF FFFF FFFF FFFF. The method then proceeds to 760.

At 760, when the predetermined pattern of data bits is detected at an output of the OTN de-multiplexer 155, a timestamp TSTMP_D and a bit position of the predetermined pattern of data bits in the de-multiplexed OTN frame are recorded. The measured total delay through the OTN de-multiplexer 155 is then determined at 760 by subtracting TSTMP_C from TSTMP_D. The static unwrapping delay for the OTN de-multiplexer 155 is then determined at 760 by subtracting an intrinsic dynamic delay associated with the OTN de-multiplexer 155 from the measured total delay and is recorded at 760 as the static unwrapping delay of the OTN de-multiplexer 155, DLY_C. The intrinsic dynamic delay associated with the OTN de-multiplexer 155 may be mathematically calculated from the recorded bit position in the de-multiplexed OTN frame and the predetermined insertion point in the ODU frame. The stored bits are then restored at 760 into the de-multiplexed OTN frame.

The method then proceeds to 762 to record a static frame alignment offset, DLY_D, at an input of the ODU receive de-framer 160 and the proceeds to 764. At 764, a timestamp, TSTMP_E, is recorded when the occurrence of a multi-frame pulse is detected at the input of the ODU receive framer 160. The method then proceeds to 766 where a timestamp, TSTMP_F is recorded when the occurrence of the multi-frame pulse is detected at the output of the ODU receive de-framer 160. The static unwrapping delay through the ODU receive de-framer 160 is then determined at 766 by subtracting TSTMP_E from TSTMP_F. The static unwrapping delay through the ODU receive de-framer 160 is recorded at 766 as DLY_E.

The method then proceeds to 768 to replace a predetermined number of bits in the de-multiplexed OTN data stream with the predetermined pattern of data bits having a predefined delimiter at a predetermined byte position in an ODU frame at the input of the OTN de-mapper 165, and store the predetermined pattern of data bits. At 768, a timestamp, TSTMP_G is also recorded when the predetermined bits are replaced. The method the proceeds to 770.

At 770, when the predetermined pattern of data bits is detected at an output of the OTN de-mapper 165, a timestamp TSTMP_H and a bit position of the predetermined pattern of data bits in the de-multiplexed and the OTN frame are recorded. The measured total delay through the OTN de-mapper 165 is then determined at 770 by subtracting TSTMP_G from TSTMP_H. The static unwrapping delay for the OTN de-mapper 165 is then determined at 770 by subtracting an intrinsic dynamic delay associated with the OTN de-mapper 165 from the measured total delay and is recorded at 770 as the static unwrapping delay of the OTN de-mapper 165, DLY_F. The intrinsic dynamic delay associated with the OTN de-mapper 165 may be mathematically calculated from the recorded bit position in the de-mapped OTN frame and the predetermined insertion point in the ODU frame. The stored bits are then restored at 770 into the de-mapped OTN frame.

The method then proceeds to 772 to determine the static unwrapping delay for the OTN unwrapping data path 110 by summing DLY_A, DLY_B, DLY_C, DLY_D, DLY_E, and DLY_F.

The examples shown with reference to FIG. 12 and FIG. 13 illustrate that the static wrapping and unwrapping delays within each individual OTN wrapping device in the forward and reverse data paths 825, 830 shown in FIG. 8 may be adjusted such that the static wrapping and unwrapping delays become symmetrical, without the need to obtain or use information from any other OTN wrapping devices in the end-to-end data path. When the delays of every OTN wrapping device in a communication data path are symmetrical, and the transmission medium (i.e. the optical cable) delay is symmetrical, the end-to-end data path delay will become symmetrical.

The delays measured in the examples described above with respect to FIG. 12 and FIG. 13 may be utilized to determine how much static delay adjustment is required to make the static wrapping and unwrapping delays of an OTN wrapping device symmetrical. In an embodiment, the static wrapping and unwrapping delays may be adjusted in an OTN wrapper device by including additional first-in-first-out (FIFO) buffers of an appropriate size and positioning the additional FIFO buffers at appropriate locations. The appropriate size of the additional FIFO buffers may be determined by the difference in the static wrapping and unwrapping delays. The additional FIFO buffers may be positioned in the OTN wrapping device based on which of the OTN wrapping or unwrapping operations has the smaller static delay.

Alternative methods for adjusting the static wrapping delay at an OTN wrapping device will now be described.

In a wrapping operation, a client data stream is inserted into a carrier data stream. The payload capacity of the carrier data stream exceeds the rate of the client data stream. The amount of client data inserted per unit time can be controlled. In normal operation the amount of client data inserted into the carrier per unit time is fixed by the ratio of the rate of the client data stream and the rate of the carrier data stream. For the purposes of the present disclosure, this amount of client data per unit time is referred to as the nominal client data rate. To maintain the rate of the carrier data stream constant, the client data stream is buffered in a first in first out memory (FIFO), the fill level of which is monitored. The carrier data rate is adjusted by inserting justification control bytes into the carrier data stream in order to maintain the long term average buffer fill level constant. The insertion of a justification control byte is called a justification event.

To increase the latency, the amount of client data inserted per unit time is temporarily decreased below the nominal client data rate. The remaining client data is buffered in the FIFO increasing its fill level. To decrease the latency, the amount of client data inserted per unit time is temporarily increased above the nominal client data rate. The excess client data is supplied by depleting the FIFO, decreasing its fill level.

In an embodiment, the static wrapping delay at an OTN wrapping device maybe adjusted by modifying a mapping or multiplexing justification operation's normal behavior to speed up or slow down the insertion of Justification Control bytes and hence the OTN wrapping operation data intake rate. The mapping or multiplexing justification operations may be modified utilizing, for example, a hardware or firmware control mechanism. Slowing down the OTN wrapping operation data intake rate causes a level of the FIFO to rise, which causes the static wrapping delay to increase. Alternatively, speeding up the OTN wrapping operation data intake causes the level of the FIFO to fall, which causes the static wrapping delay to decrease.

In an alternative embodiment, if the mapping/multiplexing operation monitors the clock of the incoming client data stream and adjusts its justification events to account for clock rate offsets, then the static wrapping delay may be adjusted by temporarily adding a positive or negative offset to the clock measurements, which causes the mapping/multiplexing operation to generate more justification events or fewer justification events. The FIFO will fill or empty as a result. For example, to obtain 1 ps of extra delay, an offset of −1 ppm may be added for a period of one second. After this period ends, the offset is removed.

In an alternative embodiment, if the mapping/multiplexing operation monitors the FIFO buffer level and tries to maintain this buffer at a predetermined threshold level by making justification events, then this threshold level may be adjusted directly to increase/decrease the depth at which this mechanism settles. The change in buffer depth provides the desired adjustment to the static wrapping delay.

Alternative methods for adjusting the static unwrapping delay at an OTN wrapping device will now be described. The static unwrapping delay may be adjusted by modifying the de-mapped or de-multiplexed client's SERDES to speed up or slow down the output data rate. In an embodiment, a hardware or firmware control mechanism may be utilized to modify the de-mapped or de-multiplexed client's SERDES. Speeding up the output data rate causes the level of a buffer associated with the de-mapping/de-multiplexing operation to fall, which causes the static unwrapping delay to decrease. Slowing down the output data rate causes the level of a buffer associated with the de-mapping/de-multiplexing operation to rise, which causes the static unwrapping delay to increase.

In an alternative embodiment, if direct control over the nominal clock rate of the transmit SERDES (if it has a fractional-N clock synthesis unit (CSU)) can be controlled directly, the nominal clock rate of the transmit SERDES can be changed to add a certain offset for a predetermined time period to achieve a desired static unwrapping delay adjustment. For example, to obtain 1 ps of extra delay, the fractional-N CSU of the transmit SERDES may be adjusted to decrease its nominal clock rate by 1 ppm and this adjusted nominal clock rate may be maintained at this level for a period of one second. After this time period ends, the transmit SERDES' coefficients are returned to their normal values.

In an alternative embodiment, if the de-mapping/de-multiplexing operations monitor a buffer level and tries to maintain this buffer at a predetermined threshold level by speeding up or slowing down the transmit SERDES, then this threshold level may be adjusted directly to increase/decrease the depth at which the control mechanism settles. The change in buffer depth provides the desired adjustment to the static unwrapping delay.

For both the above cases, after the adjustment is completed, the delay measurements are repeated to confirm the desired static unwrapping delay has been achieved.

Advantageously, the method and system of the present disclosure enable OTN to be used as a carrier of symmetric latency-sensitive CBR client data streams. The method and system of the present disclosure enable an OTN wrapper device in an OTN, with any number of OTN wrapping and unwrapping operations within it, to be self-symmetrical, thereby obviating the need for any OTN wrapping device in the OTN to be aware of any other OTN wrapping devices. Also, the method and system of the present disclosure obviate the need for the OTN wrapping layer to communicate its asymmetric delays to another network layer, such as a IEEE or CPRI network layer, so that the other network layer may compensate for the asymmetric delay induced on the CBR client data stream that is transported over OTN. Such a communication may be very difficult to achieve in real-life applications because the OTN operations may be physically and/or conceptually separated from other network operations, such as CPRI and IEEE 1588 operations.

Embodiments of the disclosure may be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations may also be stored on the machine-readable medium. The instructions stored on the machine-readable medium may be executed by a processor or other suitable processing device, and may interface with circuitry to perform the described tasks.

The above-described embodiments are intended to be examples only. Alterations, modifications, and variations may be effected to the particular embodiments by those of skill in the art without departing from the scope, which is defined solely by the claims appended hereto.

What is claimed is:

1. A method of enabling transport of symmetric latency-sensitive constant bit rate (CBR) client data streams over an Optical Transport Network (OTN), the method comprising:
   performing, utilizing an OTN wrapping device, an OTN wrapping operation on a received first CBR client data stream to form a first framed OTN data stream, the first framed OTN data stream including the first CBR client data stream;
   determining a static wrapping delay induced on the first CBR client data stream by the OTN wrapping operation, the determining a static wrapping delay comprising:
      (a) measuring a total wrapping delay induced on the first CBR client data stream by the OTN wrapping operation;
      (b) determining an intrinsic dynamic wrapping delay associated with the OTN wrapping operation; and
      (c) obtaining the static wrapping delay by subtracting the determined intrinsic dynamic wrapping delay from the measured total wrapping delay;
   performing, utilizing the OTN wrapping device, an OTN unwrapping operation on a received second framed OTN data stream to extract a second CBR client data stream from the second framed OTN data stream, the second framed OTN data stream including the second CBR client data stream;
   determining a static unwrapping delay induced on the second CBR client data stream by the OTN unwrapping operation; and
   equalizing the determined static wrapping and unwrapping delays by adjusting, at the OTN wrapping device, at least one of the static wrapping delay and the static unwrapping delay.

2. The method of claim 1, wherein:
   the OTN wrapping operation comprises an aggregate OTN wrapping operation comprising a plurality of cascaded OTN wrapping operations, each of the plurality of cascaded OTN wrapping operations being an individual OTN wrapping operation;
   said determining the static wrapping delay further comprises determining the static wrapping delay induced on the first CBR client data stream for each of the plurality of cascaded OTN wrapping operations and aggregating the static wrapping delay determined for each of the plurality of cascaded OTN operations;
   the OTN unwrapping operation comprises an aggregate OTN unwrapping operation comprising a plurality of cascaded OTN unwrapping operations, each of the plurality of cascaded OTN unwrapping operations being an individual OTN unwrapping operation; and
   said determining the static unwrapping delay comprises determining the static unwrapping delay induced on the second CBR client data stream for each of the plurality of cascaded OTN unwrapping operations and aggregating the static unwrapping delay determined for each of the plurality of cascaded OTN operations.

3. The method of claim 1, wherein said adjusting at least one of the static wrapping delay and the static unwrapping delay is based on a difference between the static wrapping delay and the static unwrapping delay.

4. The method of claim 1, wherein said equalizing by adjusting comprises:
   comparing the static wrapping delay to a predetermined value;
   when the static wrapping delay and the predetermined value are unequal, adjusting the static wrapping delay to match the predetermined value;
   comparing the static unwrapping delay to a predetermined value; and
   when the static unwrapping delay and the predetermined value are unequal, adjusting the static unwrapping delay to match the predetermined value.

5. The method of claim 2, wherein said determining the static wrapping delay induced on the first CBR client data stream for each of the plurality of cascaded OTN wrapping operations comprises:
   measuring a total individual wrapping delay induced on the first CBR client data stream by each of the plurality of cascaded OTN wrapping operations;
   determining an individual intrinsic dynamic wrapping delay associated with each of the plurality of cascaded OTN wrapping operations; and
   obtaining the static wrapping delay induced on the first CBR client data stream for each of the plurality of cascaded OTN wrapping operations by subtracting, for each of the plurality of cascaded OTN wrapping operations, the determined individual intrinsic dynamic wrapping delay from the measured total individual wrapping delay.

6. The method of claim 1, wherein said measuring the total wrapping total delay comprises:
   (d) replacing a predetermined number of client data bits in the first CBR client data stream with a predetermined pattern of data bits;
   (e) detecting, at an input of the OTN wrapping operation, the predetermined pattern of data bits;
   (f) recording a first time when the predetermined pattern of data bits is detected at the input of the OTN wrapping operation;
   (g) detecting, at an output of the OTN wrapping operation, the predetermined pattern of data bits in the framed OTN data stream;
   (h) recording a second time when the predetermined pattern of data bits in the first framed OTN data stream is detected at the output of the OTN wrapping operation;
   (i) subtracting the first time from the second time to obtain the total wrapping delay; and
   (j) restoring the predetermined number of client data bits in the first framed OTN data stream at the output of the OTN wrapping operation.

7. The method of claim 6, further comprising:
   repeating (d)-(j), (b), and (c) for a plurality of iterations; and averaging the static wrapping delays obtained from each iteration to reduce the effects of measurement noise.

8. The method of claim 6, wherein said determining the intrinsic dynamic wrapping delay comprises:
detecting, at the output of the OTN wrapping operation, a position of the predetermined pattern of data bits in an OTN frame of the first framed OTN data stream; and
obtaining the intrinsic dynamic delay associated with the OTN wrapping operation for the detected position of the predetermined pattern of data bits in the OTN frame of the first framed OTN data stream.

9. The method of claim 1, wherein said measuring a total wrapping delay comprises:
(k) identifying a set of data bits in the first CBR client data stream;
(l) detecting, at an input of the OTN wrapping operation, the set of data bits;
(m) recording a first time when the set of data bits is detected at the input of the OTN wrapping operation;
(n) detecting, at an output of the OTN wrapping operation, the set of data bits in the first framed OTN data stream;
(o) recording a second time when the set of data bits in the framed OTN data stream is detected at the output of the OTN wrapping operation; and
(p) subtracting the first time from the second time to obtain the total wrapping delay.

10. The method of claim 9, further comprising:
repeating (k)-(p), (b) and (c) for a plurality of iterations; and
averaging the static wrapping delays obtained from each iteration to reduce the effects of measurement noise.

11. The method of claim 9, wherein the set of data bits is a naturally occurring pattern of data bits in the CBR client data stream.

12. A method of enabling transport of symmetric latency-sensitive constant bit rate (CBR) client data streams over an Optical Transport Network (OTN), the method comprising:
performing, utilizing an OTN wrapping device, an OTN wrapping operation on a received first CBR client data stream to form a first framed OTN data stream, the first framed OTN data stream including the first CBR client data stream;
determining a static wrapping delay induced on the first CBR client data stream by the OTN wrapping operation;
performing, utilizing the OTN wrapping device, an OTN unwrapping operation on a received second framed OTN data stream to extract a second CBR client data stream from the second framed OTN data stream, the second framed OTN data stream including the second CBR client data stream;
determining a static unwrapping delay induced on the second CBR client data stream by the OTN unwrapping operation, the determining a static unwrapping delay comprising:
(a) measuring a total unwrapping delay induced on the second CBR client data stream by the OTN unwrapping operation;
(b) determining an intrinsic dynamic unwrapping delay induced on the second CBR client data stream by the OTN unwrapping operation; and
(c) obtaining the static unwrapping delay by subtracting the determined intrinsic dynamic unwrapping delay from the measured total unwrapping delay; and equalizing the determined static wrapping and unwrapping delays by adjusting, at the OTN wrapping device, at least one of the static wrapping delay and the static unwrapping delay.

13. The method of claim 2, wherein said determining the static unwrapping delay induced on the second CBR client data stream for each OTN unwrapping operation of the series of cascaded OTN unwrapping operations comprises:
measuring a total individual unwrapping delay induced on the second CBR client data stream by each OTN unwrapping operation;
determining an intrinsic dynamic unwrapping delay associated with each OTN unwrapping operation; and
obtaining the individual static unwrapping delay for each OTN unwrapping operation by subtracting the determined intrinsic dynamic unwrapping delay for each OTN unwrapping operation from the measured total individual unwrapping delay for each OTN unwrapping operation.

14. The method of claim 12, wherein said measuring the total unwrapping delay comprises:
(d) replacing a predetermined number of client data bits of the second CBR client data stream with a predetermined pattern of data bits;
(e) detecting, at an input of the OTN unwrapping operation, the predetermined pattern of data bits;
(f) recording a first time when the predetermined pattern of data bits is detected at the input of the OTN unwrapping operation;
(g) detecting, at an output of the OTN unwrapping operation, the predetermined pattern of data bits;
(h) recording a second time when the predetermined pattern of data bits is detected at the output of the OTN unwrapping operation;
(i) subtracting the first time from the second time to obtain the total unwrapping delay; and
(j) restoring the predetermined number of client data bits in the second CBR client data stream at the output of the OTN unwrapping operation.

15. The method of claim 14, further comprising:
excluding, from the measurement of the total unwrapping delay, an intrinsic dynamic delay associated with OTN Forward Error Correction decoding of in the OTN unwrapping operation.

16. The method of claim 14, further comprising:
repeating (d)-(j), (b), and (c) for a plurality of iterations; and
averaging the static unwrapping delays obtained from each iteration to reduce the effects of measurement noise.

17. The method of claim 14, wherein said determining the intrinsic dynamic unwrapping delay comprises:
detecting, at the input of the OTN unwrapping operation, a position of the predetermined pattern of data bits in an OTN frame of the second framed OTN data stream; and
obtaining the intrinsic dynamic delay associated with the OTN unwrapping operation for the position of the predetermined pattern of data bits in the OTN frame of the second framed OTN data stream.

18. The method of claim 12, wherein said measuring the total unwrapping delay comprises:
(k) identifying a set of data bits in the second framed OTN data stream;
(l) detecting, at an input of the OTN unwrapping operation, the set of data bits;
(m) recording a first time when the set of data bits is detected at the input of the OTN unwrapping operation;

(n) detecting, at an output of the OTN unwrapping operation, the set of data bits in the second CBR client data stream;

(o) recording a second time when the set of data bits in the second CBR client data stream is detected at the output of the OTN unwrapping operation; and (p) subtracting the first time from the second time to obtain the total unwrapping delay.

19. The method of claim 18, further comprising:
excluding, from the measurement of the total unwrapping delay, an intrinsic dynamic delay associated with OTN Forward Error Correction decoding in the OTN unwrapping operation.

20. The method of claim 18, further comprising:
repeating (k)-(p), (b), and (c) for a plurality of iterations; and
averaging the static unwrapping delays obtained from each iteration to reduce the effects of measurement noise.

21. The method of claim 18, wherein the set of data bits is a naturally occurring pattern of data bits in the second framed OTN data stream.

22. The method of claim 1, wherein said adjusting comprises adjusting the static wrapping delay when the static wrapping delay is greater than the static unwrapping delay.

23. The method of claim 22, wherein said adjusting comprises adjusting a rate of the OTN wrapping operating for a predetermined period of time.

24. The method of claim 1, wherein said adjusting comprises adjusting the static unwrapping delay when the static unwrapping delay is greater than the static wrapping delay.

25. The method of claim 24, wherein said adjusting comprises adjusting a rate of the OTN unwrapping operation for a predetermined period of time.

26. A non-transitory computer-readable medium comprising computer-readable instructions executable by a processor to perform the method of claim 1.

27. A system for enabling transport of symmetric latency-sensitive constant bit rate (CBR) client data streams over an Optical Transport Network (OTN), the system comprising:
an OTN wrapping device configured to:
perform an OTN wrapping operation on a first CBR client data stream received from a network to form a first framed OTN data stream, the first framed OTN data stream including the first CBR client data stream; and
perform an OTN unwrapping operation on a second framed OTN data stream received from the network to extract a second CBR client data stream from the second framed OTN data stream, the second framed OTN data stream including the second CBR client data stream;
a processor operably coupled to the OTN wrapping device and configured to:
determine a static wrapping delay induced on the first CBR client data stream by the OTN wrapping operation, the determining a static wrapping delay comprising:
(a) measuring a total wrapping delay induced on the first CBR client data stream by the OTN wrapping operation;
(b) determining an intrinsic dynamic wrapping delay associated with the OTN wrapping operation; and
(c) obtaining the static wrapping delay by subtracting the determined intrinsic dynamic wrapping delay from the measured total wrapping delay;
determine a static unwrapping delay induced on the second CBR client data stream by the OTN unwrapping operation; and
equalize the determined static wrapping and unwrapping delays by adjusting at least one of the determined static wrapping delay and the static unwrapping delay.

28. The system of claim 27, wherein:
the OTN wrapping operation further comprises an aggregate OTN wrapping operation comprising a plurality of cascaded OTN wrapping operations;
the processor is further configured to determine the static wrapping delay by determining the static wrapping delay induced on the first CBR client data stream for each of the plurality of cascaded OTN wrapping operations and aggregating the static wrapping delay determined for each of the plurality of cascaded OTN operations;
the OTN unwrapping operation further comprises an aggregate OTN unwrapping operation comprising a plurality of cascaded OTN unwrapping operations; and
the processor is further configured to determine the static unwrapping delay by determining the static unwrapping delay induced on the second CBR client data stream for each of the plurality of cascaded OTN unwrapping operations and aggregating the static unwrapping delay determined for each of the plurality of cascaded OTN operations.

29. The system of claim 27, wherein the processor is further configured to equalize determined static wrapping and unwrapping delays by adjusting the at least one of the static wrapping delay and the static unwrapping delay based on a difference between the static wrapping delay and the static unwrapping delay.

30. The system of claim 27, wherein the processor is further configured to adjust at least one of the static wrapping delay and the static unwrapping delay by:
comparing the static wrapping delay to a predetermined value;
when the static wrapping delay and the predetermined value are unequal, adjusting the static wrapping delay to match the predetermined value;
comparing the static unwrapping delay to a predetermined value; and
when the static unwrapping delay and the predetermined value are unequal, adjusting the static unwrapping delay to match the predetermined value.

31. The system of claim 28, wherein said determining the static wrapping delay induced on the first CBR client data stream for each of the plurality of OTN wrapping operations comprises:
measuring a total individual delay induced on the first CBR client data stream by each of the plurality of OTN wrapping operations;
determining an individual intrinsic dynamic wrapping delay associated with each of the plurality of OTN wrapping operations; and
obtaining the static wrapping delay induced on the first CBR client data stream for each of the plurality of OTN wrapping operations by subtracting, for each of the plurality of OTN wrapping operations, the determined intrinsic dynamic wrapping delay from the measured total individual wrapping delay.

32. The system of claim 27, wherein said measuring the total wrapping total delay comprises:

(d) replacing a predetermined number of client data bits in the first CBR client data stream with a predetermined pattern of data bits;
(e) detecting, at an input of the OTN wrapping device, the predetermined pattern of data bits;
(f) recording a first time when the predetermined pattern of data bits is detected;
(g) detecting, at an output of the OTN wrapping operation, the predetermined pattern of data bits in the first framed OTN data stream;
(h) recording a second time when the predetermined pattern of data bits in the first framed OTN data stream is detected;
(i) subtracting the first time from the second time to obtain the total wrapping delay; and
(j) restoring the predetermined number of client data bits in the first framed OTN data stream at the output of the OTN wrapping operation.

33. The system of claim 32, wherein the processor is further configured to:
repeat (d)-(j), (b), and (c) for a plurality of iterations; and
average the static wrapping delays obtained from each iteration to reduce the effects of measurement noise.

34. The system of claim 32, wherein said determining an intrinsic dynamic wrapping delay comprises:
detecting, at the output of the OTN wrapping operation, a position of the set of predetermined data bits in an OTN frame of the first framed OTN data stream; and
obtaining the intrinsic dynamic delay associated with the detected position of the set of predetermined data bits in the OTN frame.

35. The system of claim 27, wherein said measuring the total wrapping delay comprises:
(k) identifying a set of data bits in the CBR client data stream;
(l) detecting, at an input of the OTN wrapping device, the set of data bits;
(m) recording a first time when the set of data bits is detected;
(n) detecting, at an output of the OTN wrapping operation, the set of data bits in the first framed OTN data stream;
(o) recording a second time when the set of data bits in the framed OTN data stream is detected; and
(p) subtracting the first time from the second time to obtain the total wrapping delay.

36. The system of claim 35, wherein the processor is further configured to:
repeat (k)-(p), (b), and (c) for a plurality of iterations; and
average the static wrapping delays obtained from each iteration to reduce the effects of measurement noise.

37. The system of claim 35, wherein the set of data bits is a naturally occurring pattern of data bits in the CBR client data stream.

38. A system for enabling transport of symmetric latency-sensitive constant bit rate (CBR) client data streams over an Optical Transport Network (OTN), the system comprising:
an OTN wrapping device configured to:
perform an OTN wrapping operation on a first CBR client data stream received from a network to form a first framed OTN data stream, the first framed OTN data stream including the first CBR client data stream; and
perform an OTN unwrapping operation on a second framed OTN data stream received from the network to extract a second CBR client data stream from the second framed OTN data stream, the second framed OTN data stream including the second CBR client data stream;
a processor operably coupled to the OTN wrapping device and configured to:
determine a static wrapping delay induced on the first CBR client data stream by the OTN wrapping operation;
determine a static unwrapping delay induced on the second CBR client data stream by the OTN unwrapping operation, the determining a static unwrapping delay comprising:
(a) measuring a total unwrapping delay induced on the second CBR client data stream by the OTN unwrapping operation;
(b) determining an intrinsic dynamic unwrapping delay induced on the second CBR client data stream by the OTN unwrapping operation; and
(c) obtaining the static unwrapping delay by subtracting the determined intrinsic dynamic unwrapping delay from the measured total unwrapping delay; and
equalize the determined static wrapping and unwrapping delays by adiustinq at least one of the determined static wrapping delay and the static unwrapping delay.

39. The system of claim 28, wherein said determining the static unwrapping delay induced on the second CBR client data stream for each of the plurality of cascaded OTN unwrapping operations further comprises:
measuring a total individual unwrapping delay induced on the second CBR client data stream by each of the plurality of cascaded OTN unwrapping operations;
determining an intrinsic dynamic unwrapping delay associated with each of the plurality of OTN unwrapping operations; and
obtaining the static unwrapping delay induced on the second CBR client data stream for each of the plurality of OTN unwrapping operations by subtracting, for each of the plurality of OTN wrapping operations, the determined intrinsic dynamic unwrapping delay from the measured total individual unwrapping delay.

40. The system of claim 38, wherein said measuring the total unwrapping delay comprises:
(d) replacing a predetermined number of client data bits of the second CBR client data stream with a predetermined pattern of data bits;
(e) detecting, at an input of the OTN unwrapping operation, the predetermined pattern of data bits;
(f) recording a first time when the predetermined pattern of data bits is detected at the input of the OTN unwrapping operation;
(g) detecting, at an output of the OTN unwrapping operation, the predetermined pattern of data bits;
(h) recording a second time when the predetermined pattern of data bits is detected at the output of the OTN unwrapping operation;
(i) subtracting the first time from the second time; and
(j) restoring the predetermined number of client data bits in the second CBR client data stream at the output of the OTN unwrapping operation.

41. The system of claim 40, wherein the processor is further configured to:
exclude, from the measurement of the total unwrapping delay, an intrinsic delay associated with OTN Forward Error Correction decoding in the OTN unwrapping operation.

42. The system of claim 40, wherein the processor is further configured to:
  repeat (d)-(j), (b), and (c) for a plurality of iterations; and
  average the static unwrapping delays obtained from each iteration to reduce the effects of measurement noise.

43. The system of claim 40, wherein said determining the intrinsic dynamic unwrapping delay comprises:
  detecting, at the input of the OTN unwrapping operation, a position of the predetermined pattern of data bits in the second framed OTN data stream; and
  obtaining the intrinsic dynamic delay associated with the OTN unwrapping operation for the position of the predetermined pattern of data bits in the second framed OTN data stream.

44. The system of claim 38, wherein said measuring the total unwrapping delay comprises:
  (k) identifying a set of data bits in the second framed OTN data stream;
  (l) detecting, at an input of the OTN unwrapping operation, the set of data bits;
  (m) recording a first time when the set of data bits is detected at the input of the OTN unwrapping operation;
  (n) detecting, at an output of the OTN unwrapping operation, the set of data bits in the second CBR client data stream;
  (o) recording a second time when the set of data bits in the in the second CBR client data stream is detected at the output of the OTN unwrapping operation; and
  (p) subtracting the first time from the second time to obtain the total unwrapping delay.

45. The system of claim 44, wherein the processor is further configured to:
  exclude, from the measurement of the total unwrapping delay, an intrinsic delay associated with OTN Forward Error Correction decoding in the OTN unwrapping operation.

46. The method of claim 44, wherein the processor is further configured to:
  repeat (k)-(p), (b), and (c) for a plurality of iterations; and
  average the static unwrapping delays obtained from each iteration to reduce the effects of measurement noise.

47. The system of claim 44, wherein the set of data bits is a naturally occurring pattern of data bits in the second CBR client data stream.

48. The system of claim 27, wherein the processor is further configured to adjust the static wrapping delay when the static wrapping delay is greater than the static unwrapping delay.

49. The system of claim 48, wherein the processor is further configured to adjust a rate of the OTN wrapping operating for a predetermined period of time.

50. The system of claim 27, wherein the processor is further configured to adjust the static unwrapping delay when the static unwrapping delay is greater than the static wrapping delay.

51. The system of claim 50, wherein the processor is further configured to adjust a rate of the OTN unwrapping operation for a predetermined period of time.

52. A non-transitory computer-readable medium comprising computer-readable instructions executable by a processor to perform the method of claim 12.

* * * * *